(12) United States Patent
Gildea

(10) Patent No.: US 8,013,786 B2
(45) Date of Patent: Sep. 6, 2011

(54) METHOD AND COMMUNICATION SYSTEM FOR LIMITING THE FUNCTIONALITY OF AN ELECTRONIC DEVICE

(75) Inventor: David Gildea, Menlo Park, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 496 days.

(21) Appl. No.: 12/140,942

(22) Filed: Jun. 17, 2008

(65) Prior Publication Data

US 2009/0309787 A1 Dec. 17, 2009

(51) Int. Cl.
*G01S 19/52* (2010.01)
*G01S 11/10* (2010.01)
(52) U.S. Cl. .............................. 342/357.35; 342/357.78
(58) Field of Classification Search ............. 342/357.35, 342/357.78, 461; 455/441; 340/466, 670; G01S 11/10, 13/64, 19/52
See application file for complete search history.

(56) References Cited

U.S. PATENT DOCUMENTS

| | | | |
|---|---|---|---|
| 5,225,842 A | 7/1993 | Brown et al. | |
| 5,663,734 A | 9/1997 | Krasner | |
| 5,841,396 A | 11/1998 | Krasner | |
| 5,856,802 A * | 1/1999 | Ura et al. | 342/357.35 |
| 5,883,594 A | 3/1999 | Lau | |
| 6,128,327 A * | 10/2000 | Bird et al. | 375/132 |
| 6,131,067 A | 10/2000 | Girerd et al. | |
| 6,195,040 B1 * | 2/2001 | Arethens | 342/357.25 |
| 6,496,533 B2 | 12/2002 | Lennen | |
| 6,718,174 B2 * | 4/2004 | Vayanos | 455/456.1 |
| 6,728,542 B2 * | 4/2004 | Meda | 455/445 |
| 7,054,352 B2 * | 5/2006 | Hasegawa | 375/147 |
| 7,136,015 B2 * | 11/2006 | Wakamatsu | 342/357.23 |
| 7,336,223 B2 * | 2/2008 | Franckart et al. | 342/357.35 |
| 2004/0198306 A1 | 10/2004 | Singh et al. | |
| 2006/0022868 A1 * | 2/2006 | Awata | 342/357.12 |
| 2007/0072616 A1 | 3/2007 | Irani | |
| 2008/0057942 A1 * | 3/2008 | Woods et al. | 455/425 |
| 2008/0262728 A1 * | 10/2008 | Lokshin et al. | 701/216 |
| 2009/0149147 A1 * | 6/2009 | Jonsson et al. | 455/296 |
| 2009/0240464 A1 * | 9/2009 | Dietz et al. | 702/143 |

\* cited by examiner

*Primary Examiner* — Thomas H Tarcza
*Assistant Examiner* — John B Vigushin

(57) ABSTRACT

Embodiments of the present invention recite a method and system for limiting the functionality of a mobile electronic device. In one embodiment, a Global Navigation Satellite System (GNSS) receiver configured to determine a GNSS Doppler frequency shift measurement corresponding to a GNSS signal. A control component is configured to control an operation of the mobile electronic device in response to a control signal which is generated when the GNSS Doppler frequency shift measurement is used to determine that the speed of the mobile electronic device exceeds a speed threshold.

32 Claims, 13 Drawing Sheets

US 8,013,786 B2

METHOD AND COMMUNICATION SYSTEM FOR LIMITING THE FUNCTIONALITY OF AN ELECTRONIC DEVICE

FIELD OF THE INVENTION

Embodiments of the present invention are related to the field of controlling the functionality of mobile electronic devices.

RELATED APPLICATIONS

U.S. patent application Ser. No. 12/140,889 entitled "System Having Doppler-based Control of a Mobile Device," by David Gildea, assigned to the assignee of the present invention, filed Jun. 17, 2008, and which is incorporated by reference in its entirety herein.

BACKGROUND OF THE INVENTION

Driver distractions are currently a leading cause of traffic accidents. Of particular concern are drivers who operate mobile electronic devices (e.g., cellular telephones, Personal Digital Assistants (PDAs) and the like) while driving. Many people feel that drivers who are talking on a cellular telephone are particularly prone to accidents or careless driving. This is especially true of teenage drivers who do not have the level of experience of older drivers. Talking on cellular telephones is not the only distraction that drivers face. Attempting to dial a phone number, access or send text messages, or operate the user interface in general are particularly dangerous as the driver typically is looking at the cellular telephone rather than the road.

SUMMARY OF THE INVENTION

Embodiments of the present invention recite a method and system for limiting the functionality of a mobile electronic device. In one embodiment, a Global Navigation Satellite System (GNSS) receiver configured to determine a GNSS Doppler frequency shift measurement corresponding to a GNSS signal. A control component is configured to control an operation of the mobile electronic device in response to a control signal which is generated when the GNSS Doppler frequency shift measurement is used to determine that the speed of the mobile electronic device exceeds a speed threshold.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "using," "determining," "receiving," "controlling," "calculating," "comparing," "comparing," "transmitting," "configuring," "inhibiting," "storing," "predicting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
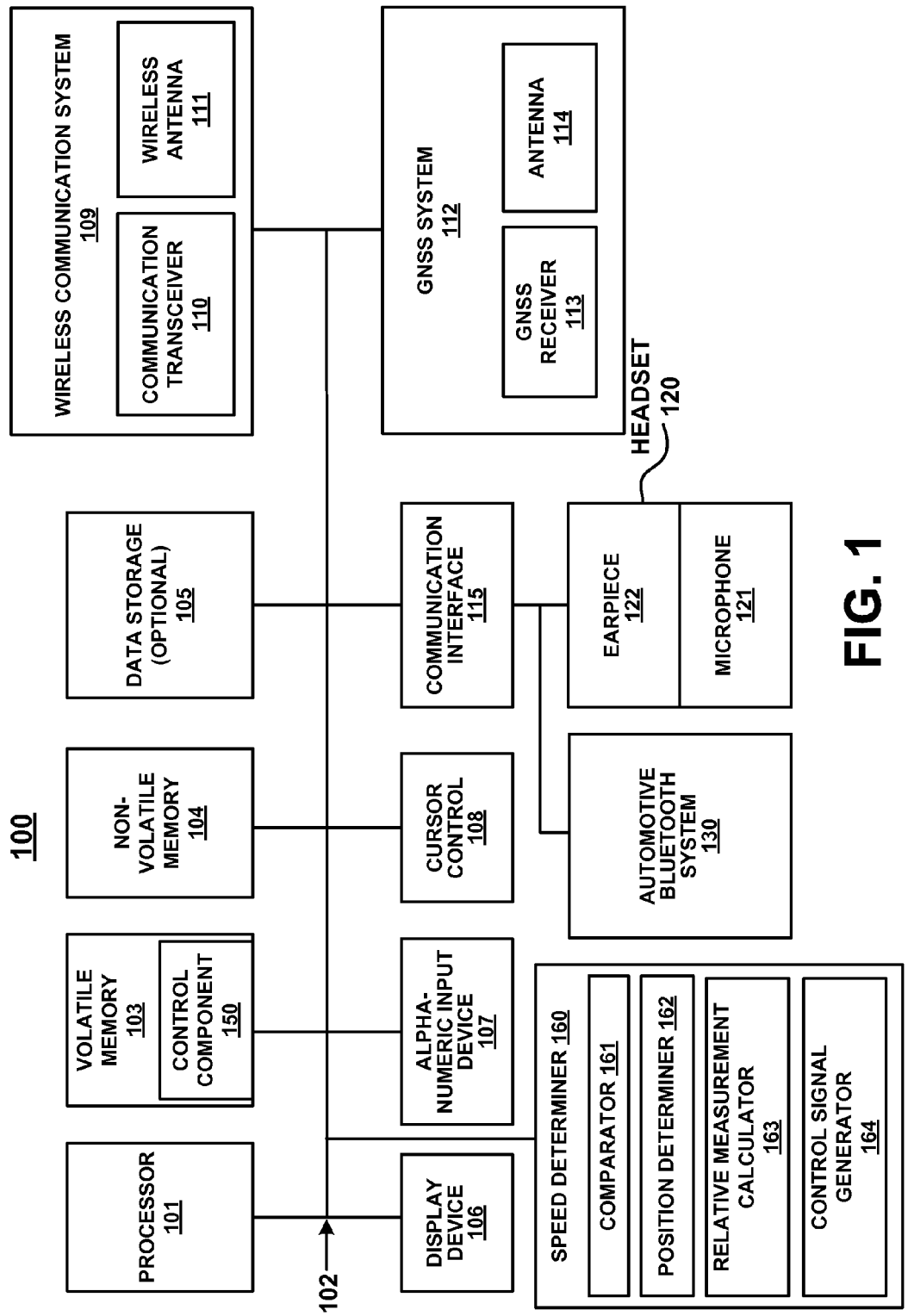
FIG. 1 is a block diagram of a mobile electronic device upon which embodiments of the present invention may be implemented.

With reference to FIG. 1, portions of the present invention are comprised of executable instructions that reside, for example, in mobile electronic device 100. In FIG. 1, mobile electronic device 100 comprises a processor 101 coupled with an address/data bus 102. Processor 101 is for processing digital information and instructions and bus 102 is for conveying digital information between various components of mobile electronic device 100. Also coupled with bus 102 is a volatile memory (e.g., RAM) 103 for storing the digital information and instructions of a more volatile nature and a non-volatile memory (e.g., ROM) 104 for storing information and instructions of a more permanent nature. In addition, mobile electronic device 100 may optionally include a data storage device 105 for storing vast amounts of data. In embodiments of the present invention, data storage device 105 may comprise a magnetic data storage device, or optical data storage device. It should be noted that instructions for processor 101 can be stored in non-volatile memory 104, volatile memory 103, or data storage device 105.

Returning still to FIG. 1, mobile electronic device 100 further comprises a display device 106, an alpha-numeric input device 107 (e.g., a keyboard), or a keypad, and an optional cursor control device 108 (e.g., mouse, trackball, light pen, wheel, etc.) for inputting data, selections, updates, etc. Display device 106 of FIG. 1 may be a liquid crystal device, or other display device suitable for creating graphic images and alpha-numeric characters recognizable to a user. In one embodiment, display device 106 may display an alpha-numeric interface which can be used to implement a "soft-key" functionality. Cursor control device 108 allows a user to dynamically signal the two dimensional movement of a visible symbol (cursor) on a display screen of display device 106. Many implementations of cursor control device 108 are known in the art including a trackball, mouse, touch pad, joystick, or special keys capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Returning to FIG. 1, mobile electronic device 100 further comprises a wireless communication system 109, comprising a wireless modem 110 and a wireless antenna 111, coupled with bus 102. A GNSS system 112, comprising a GNSS receiver 113 and a GNSS antenna 114, is also coupled with bus 102.

Wireless communication system 109 is for transmitting and receiving wireless messages (e.g., data and/or commands). In one embodiment, mobile electronic device 100 sends and receives message using the Short Message Service (SMS). However, mobile electronic device 100 is well suited to utilize other message formats as well such as the Global System for Mobile Communications (GSM) specification, or the Global Packet Radio Service (GPRS) specification. In one embodiment, wireless communications system 109 is compliant with a Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, wireless communication system 109 is compliant with the Time Division Multiple Access (TDMA) standard. In another embodiment, wireless communication system 109 is compliant with the Integrated Digital Enhanced Network (iDEN) specification. Additionally, an embodiment of the present invention is well suited to implement potential 4G networks such as the Worldwide Interoperability for Microwave Access (WiMax) technology and the 3rd Generation Partnership Project (3GPP) Long Term Evolution (LTE) technology.

GNSS system 112 is for acquiring signals used in determining the location of mobile electronic device 100. In FIG. 1, position determining component 112 comprises a GNSS antenna 114 and a GNSS receiver 113. However, mobile electronic device 100 is not limited to using a GNSS position determining system alone. For example, GNSS system 112 may also use cellular telephone signals, digital television signals, terrestrial-based navigation systems, inertial navigation systems, etc. to assist in determining its location.

In FIG. 1, mobile electronic device 100 further comprises a communication interface 115 which is coupled with bus 102. In one embodiment, communication interface 115 is communicatively coupled with a headset 120 comprising a microphone 121 and an earpiece 122. In one embodiment, headset 120 is communicatively coupled with communication interface 115 via a wireless communication system such as the Bluetooth® system. In another embodiment, headset 120 is coupled with communication interface 115 via a wired connection.

Also shown in FIG. 1 is an automotive Bluetooth® system 130 which is communicatively coupled with communication interface 115. In embodiments of the present invention, mobile electronic device 100 may be communicatively coupled with automotive Bluetooth® system 130 which permits a user to operate, for example, a cellular telephone using voice commands while operating a moving vehicle. Automotive Bluetooth® system 130 typically synchronizes with mobile electronic device 100 via a Bluetooth® system local network and interprets a user's voice commands to control mobile electronic device 100 via a Bluetooth® connection.

Also shown in FIG. 1 is a control component 150 stored in volatile memory 103. As will be discussed in greater detail below, control component 150 is for limiting the functionality of mobile electronic device 100 when the speed of mobile electronic device 100 exceeds a speed threshold. In the embodiment of FIG. 1, control component 150 comprises computer executable instructions which are loaded into volatile memory 103 when mobile electronic device 100 is powered on. In another embodiment, control component 150 can be implemented as one or more discreet hardware components resident upon mobile electronic device 100. Alternatively, control component 150 can be implemented as one or more computer firmware components.

Also shown in FIG. 1 is a speed determiner 160. Speed determiner 160 is used to determine the speed of mobile electronic device based upon processing of signals received by GNSS system 112. It is noted that the functionality of components of speed determiner 160 can be implemented as executable instructions stored in, for example, volatile memory 103. In FIG. 1, speed determiner 160 comprises a comparator 161, a position determiner 162, a relative measurement calculator 163, and a control signal generator 164. Comparator 161 is configured to compare expected GNSS Doppler frequency shifts at the position of mobile electronic device 100 with measured GNSS Doppler frequency shifts received by GNSS system 112. Position determiner 162 is configured to determine the geographic position of mobile electronic device 100 using signals received by GNSS system 112. Relative measurement calculator 163 is configured to calculate a plurality of measured range rates corresponding to a plurality of GNSS Doppler frequency shift measurements, and to calculate a plurality of expected range rates between mobile electronic device 100 and a plurality of GNSS satellites. The operation of speed determiner 160 is described in greater detail below with reference to speed determiner 533 of FIG. 5.

Figure 2:
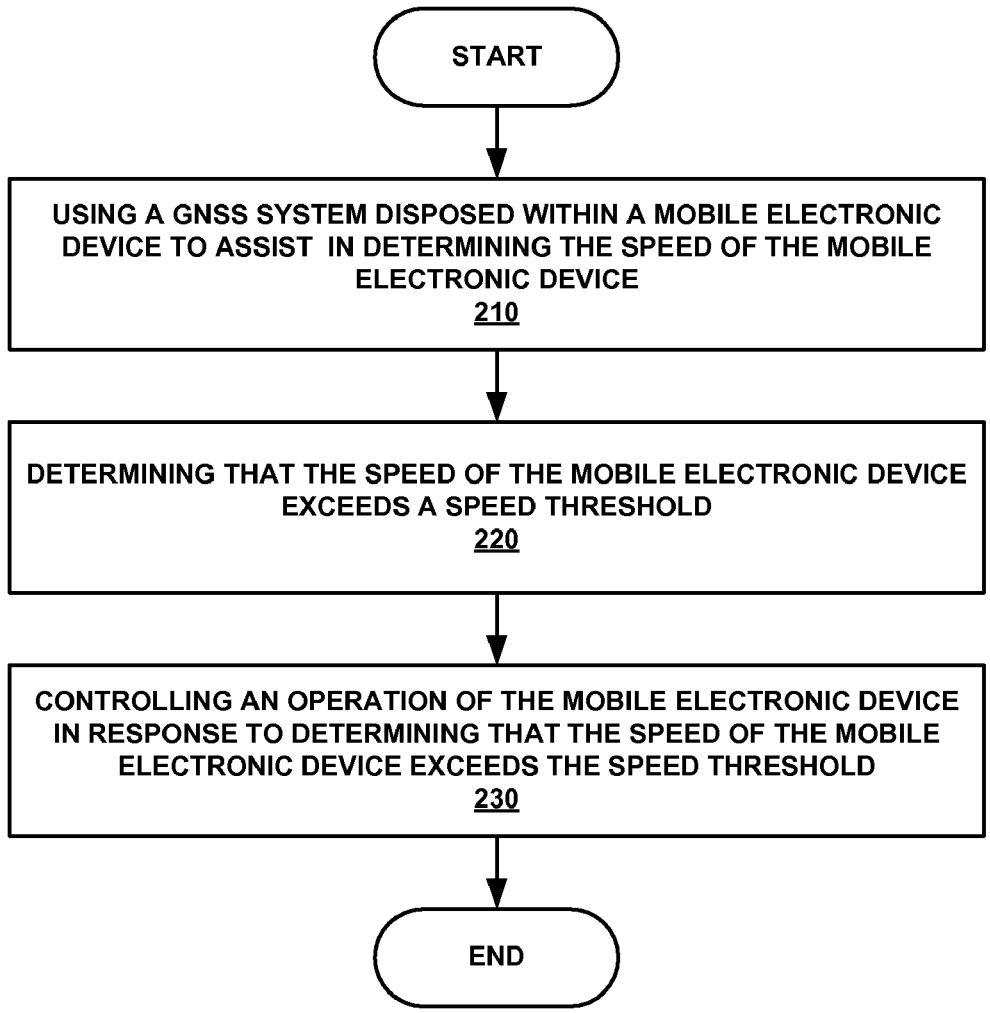
FIG. 2 is a flowchart of a method for limiting the functionality of a mobile electronic device in accordance with embodiments of the present invention.

FIG. 2 is a flowchart of a method 200 for limiting the functionality of a mobile electronic device (e.g., mobile electronic device 100 of FIG. 1) in accordance with embodiments of the present invention. In embodiments of the present invention, method 200 is implemented by control component 150 of FIG. 1. In step 210 of FIG. 2, a GNSS system disposed within a mobile electronic device is used to assist in determining the speed of the mobile electronic device. Referring again to FIG. 1, embodiments of the present invention utilize a GNSS system 112 disposed within mobile electronic device 100 to acquire signals from a plurality of orbiting navigation satellites. Processing these signals facilitates determining the geographic position and speed of mobile electronic device 100. For example, in one embodiment, successive position fixes determined by GNSS system 112, as well as the time interval between these position fixes, can be used to determine the speed of mobile electronic device 100 for a given period. In other words, the distance traveled by mobile electronic device 100 over a period of time is determined. In another embodiment, evaluation of the Doppler shift of the signals from the orbiting navigation satellites facilitates determining the speed of mobile electronic device 100.

Embodiments of the present invention benefit from the increasing integration of position determining components, such as GNSS system 112, into mobile electronic devices. As an example, cellular telephones increasingly integrate Global Positioning System (GPS) or other GNSS devices to comply with the Wireless Enhanced 911 service. Other mobile electronic devices such as Personal Digital Assistants (PDAs) or the like also increasingly integrate GNSS devices as well. Thus, embodiments of the present invention take advantage of this integration to determine the speed of mobile electronic device 100. It is noted that embodiments of the present invention are not limited to GNSS position determining systems alone. For example, GNSS system 112 can use cellular telephone signals, digital television signals, terrestrial-based navigation systems, inertial navigation systems, etc.

In step 220 of FIG. 2, it is determined that the speed of the mobile electronic device exceeds a speed threshold. In one embodiment, the determination of the speed of mobile electronic device 100 is performed by speed determiner 160 of FIG. 1. In another embodiment, the determination of the speed of mobile electronic device 100 is performed by base station 510 of FIG. 4. In embodiments of the present invention, a speed threshold is established which is used to determine if mobile electronic device 100 is being operated while in a moving vehicle. For example, the speed threshold of mobile electronic device can be set at 8 miles per hour. Thus, if it is determined that mobile electronic device 100 has a speed of 9 miles per hour, it is assumed that it is being operated by a user in a moving vehicle. It is noted that the speed threshold may be set higher or lower than 8 miles per hour in embodiments of the present invention. More generally, the speed threshold set for mobile electronic device 100 will be set higher than the normal walking or running speed of a human in order to be able to conclusively establish that mobile electronic device 100 is being operated in a moving vehicle, or at a speed at which it is desirable that the user not be distracted by operating mobile electronic device 100. In embodiments of the present invention, the geographic position of mobile electronic device 100 can be compared with an electronic map to determine whether mobile electronic device 100 is being operated in a moving vehicle on a road. For example, in one embodiment, the satellite navigation signals received by GNSS system 112 can also be used to determine the altitude at which mobile electronic device is located. Thus, if it is determined that mobile electronic device 100 is at an altitude of 10,000 feet above a road, an embodiment of the present invention determines that the functionality of mobile electronic device 100 may continue without restriction. Additionally, if the comparison of the current geographic location of mobile electronic device 100 shows that it is in the middle of a lake or river, an embodiment of the present invention may allow the functionality of mobile electronic device 100 to continue without restriction. Thus, embodiments of the present invention can differentiate between whether mobile electronic device 100 is being operated in a boat, or airplane, rather than a moving vehicle.

In step 230 of FIG. 2, the functionality of the mobile electronic device 100 is restricted based upon determining that its speed exceeds the speed threshold. In embodiments of the present invention, upon establishing that mobile electronic device 100 is being operated in a moving vehicle, the functionality of mobile electronic device 100 is restricted in order to get a user to stop using mobile electronic device in the moving vehicle. Alternatively, the functionality of mobile electronic device 100 may be automatically restricted such that operating it in a moving vehicle is undesirable, or impossible. As will be discussed in greater detail below, in one embodiment, base station 510 can inhibit the transmission of a communication addressed to mobile electronic device. Additionally, base station 510 can prevent a communication from mobile electronic device 100 from being forwarded to another communication node.

In one embodiment, base station 510 is configured to generate a control signal 590 which indicates that the speed of mobile electronic device 100 exceeds a speed threshold. In response to receiving control signal 590, control component 150 of mobile electronic device 100 will automatically control an operation of mobile electronic device 100. For example, the keypad can be disabled to prevent a user from using mobile electronic device 100 to send or receive messages. In one embodiment, mobile electronic device may be shut off in response to receiving control signal 590. Other operations which can be controlled in accordance with embodiments of the present invention are discussed in greater detail below. In one embodiment, a message is also generated to a user of mobile electronic device 100 that it cannot be operated because its speed exceeds the speed threshold. For example, if a user tries to make a cellular telephone call using mobile electronic device 100 while its speed exceeds the speed threshold, an audible signal and/or a displayed message will indicate that mobile electronic device 100 cannot be operated.

In another embodiment, when base station 510 generates control signal 590 mobile electronic device 100 initiates an action to control an operation of mobile electronic device 100. For example, in response to control signal 590, control component 150 will prevent a using mobile electronic device 100 from generating, or receiving, a message. In another embodiment, base station 510 will generate control signal 590 which conveys to mobile electronic device 100 its current speed. In one embodiment, mobile electronic device 100 then determines whether it is exceeding a speed threshold using control component 150. If mobile electronic device 100 determines that it is exceeding a speed threshold, it will automatically control an operation of mobile electronic device 100. Again, the control of operations of mobile electronic device 100 in accordance with embodiments of the present invention are discussed in greater detail below.

In another embodiment, mobile electronic device 100 is configured to determine its speed using speed determiner 160. When speed determiner 160 determines that the speed of mobile electronic device 100 exceeds a speed threshold, it generates a control signal using control signal generator 164. In one embodiment, control component 150 controls an operation of mobile electronic device 100 in response to the control signal generated by control signal generator 164 as discussed in greater detail below.

In one embodiment, mobile electronic device 100 is automatically shut off in response to determining that its speed exceeds the speed threshold. In another embodiment, an audible warning is generated in response to determining that the speed of mobile electronic device 100 exceeds the speed threshold. In one embodiment, the audible warning comprises a beep or tone to remind the user that the speed threshold has been exceeded and to take corrective action (e.g., to pull off the road, terminate the current operation, etc). In one embodiment, the audible warning becomes progressively louder each time it is repeated until corrective action is performed. In another embodiment, the audible warning comprises a verbal warning that the speed of mobile electronic device 100 exceeds the speed threshold. In another embodiment, the audible warning comprises a continuous tone which reminds the user that mobile electronic device should not be operated. In one embodiment the continuous tone is loud enough to prevent a user from being able to continue a conversation using mobile electronic device 100.

In one embodiment, the display of mobile electronic device shows a warning that mobile electronic device 100 is being operated at an unsafe speed. In one embodiment, no other text, data, graphics, or the like is displayed on display device 106 until the speed of mobile electronic device is again below the speed threshold.

In one embodiment, the operation of a keypad (e.g., alpha-numeric input device 107 of FIG. 1) is restricted until it is determined that the speed of mobile electronic device 100 again falls below the speed threshold. In one embodiment, restricting the keypad of mobile electronic device 100 comprises not processing any sequences input using the keypad. In other words, the keypad is disabled. In one embodiment, some key sequences are allowed to be processed using the keypad. For example, a user can dial 911 even if the speed of mobile electronic device exceeds the speed threshold in one embodiment. In another embodiment, a user can use the speed dialing functionality of mobile electronic device 100. This is because many users can enter short numeric sequences with a keypad without undue distraction from driving. In other words, the user may be entering the sequence by feeling the buttons of the keypad alone. In one embodiment, the allowed key sequence may be pre-determined. For example, a parent can have mobile electronic device 100 configured such that their children can speed dial them, but are prevented from speed dialing their friends or other parties while the speed of mobile electronic device exceeds the speed threshold. In one embodiment, the allowed key sequence can be restricted to single digit speed dialing numbers, two digit speed dialing numbers, etc.

Thus, embodiments of the present invention are well suited to preventing drivers from performing actions which may distract them from operating a vehicle safely. For example, in one embodiment a user is restricted from trying to manually dial a phone number, or send a text message, if the vehicle in which they are riding is traveling faster than the speed threshold. Furthermore, embodiments of the present invention may progressively increase the level of functionality restriction imposed upon mobile electronic device 100 if a user continues to operate it while in a moving vehicle. For example, if a user continues to operate mobile electronic device 100 after an audible warning has been generated, one embodiment will automatically shut down mobile electronic device 100. In another embodiment, operation of mobile electronic device 100 is suspended until the speed of mobile electronic device 100 is again below the speed threshold. In other words, mobile electronic device 100 remains powered on, but the user is unable to utilize it until its speed again falls below the speed threshold.

In one embodiment, restricting the functionality of mobile electronic device 100 comprises permitting incoming cellular telephone calls, but preventing a user from making any outgoing calls. This prevents the user from being distracted by operating mobile electronic device 100. Thus, if an incoming call arrives, the user can simply press one button to connect the call. In one embodiment, the incoming phone call is restricted to certain permitted originators. For example, a parent can have mobile electronic device 100 configured such that their children can receive a phone call from the parent, but not from friends of the children or other parties. However, if the phone call is not from a permitted originator, the phone call is automatically terminated. Alternatively, the phone call may be automatically redirected to a voice mail system. In one embodiment, if a phone call originated prior to determining that the speed of mobile electronic device 100 has exceeded the speed threshold, the phone call is allowed to continue until the user has terminated the phone call.

In one embodiment, mobile electronic device 100 determines whether a user is utilizing a hands free device (e.g., headset 120, or automotive Bluetooth® system 130 of FIG. 1). If a hands free device is not being used to operate mobile electronic device 100, any of the above mentioned restrictions, or a combination thereof, may be automatically performed in accordance with embodiments of the present invention. This is desirable due to the fact that many states have passed, or are considering, legislation requiring drivers to user hands free devices when operating a cellular telephone in a moving vehicle. Thus, embodiments of the present invention facilitate compliance with mandated requirements regarding the operation of cellular telephones.

In one embodiment, a voice activation system may be required in accordance with embodiments of the present invention. Voice activation systems allow a user to speak a command which is then executed by, for example, mobile electronic device 100. Thus, rather than using alpha-numeric input device 107 to dial a number, the user can simply speak the telephone number, or say the name of the party being dialed. In embodiments of the present invention, if a voice activation system is not utilized with mobile electronic device 100, any of the above mentioned restrictions, or a combination thereof, may be automatically performed in accordance with embodiments of the present invention. In one embodiment, an outgoing phone call is restricted to certain permitted parties. For example, a parent can have mobile electronic device 100 configured such that their children can call their parent, but not call friends of the children or other parties. Thus, if the outgoing phone call is not to an allowed party, the phone call is terminated.

Embodiments of the present invention may be implemented voluntarily, or in response to a mandated requirement (e.g., a legislative restriction on the use of cellular telephones or other mobile electronic devices). For example, a parent purchasing a cellular telephone (e.g., mobile electronic device 100) for a child may voluntarily choose to use embodiments of the present invention to limit how or when the cellular telephone is used by their child. In one embodiment, when the cellular telephone is being configured (e.g., at a store), control component 150 is loaded into non-volatile memory 104. When the cellular telephone is on, control component 150 is loaded into volatile memory 103 and is used to limit the functionality of the cellular telephone as described above. Thus, parents can take steps to prevent their children from using a cellular telephone while driving and thus operate the vehicle safely. Alternatively, any user may elect to implement an embodiment of the present invention as an added safety measure. Additionally, insurance companies may find it beneficial to offer rate discounts for drivers who implement embodiments of the present invention in their cellular telephones as an incentive.

Embodiments of the present invention may also be voluntarily implemented by, for example, a cellular telephone manufacturer, or cellular telephone service provider in order to unilaterally restrict the use of cellular telephones while the user is operating a vehicle. It is noted that embodiments of the present invention may also be implemented by manufacturers or service providers of other mobile electronic devices who are seeking to curtail or restrict the use of mobile electronic devices by users who are operating a vehicle.

Embodiments of the present invention may also be implemented in response to a mandated requirement to restrict the use of cellular telephone, or other mobile electronic devices, by users who are operating a vehicle. For example, if a legislative body passes a law requiring the restriction of mobile electronic devices by users who are operating a vehicle, embodiments of the present invention provide a method of complying with that requirement. Currently, while states have enacted legislation intended to prevent cell phone use by people driving vehicles, many people ignore these laws, or forget and use their cell phones anyway.

Figure 3:
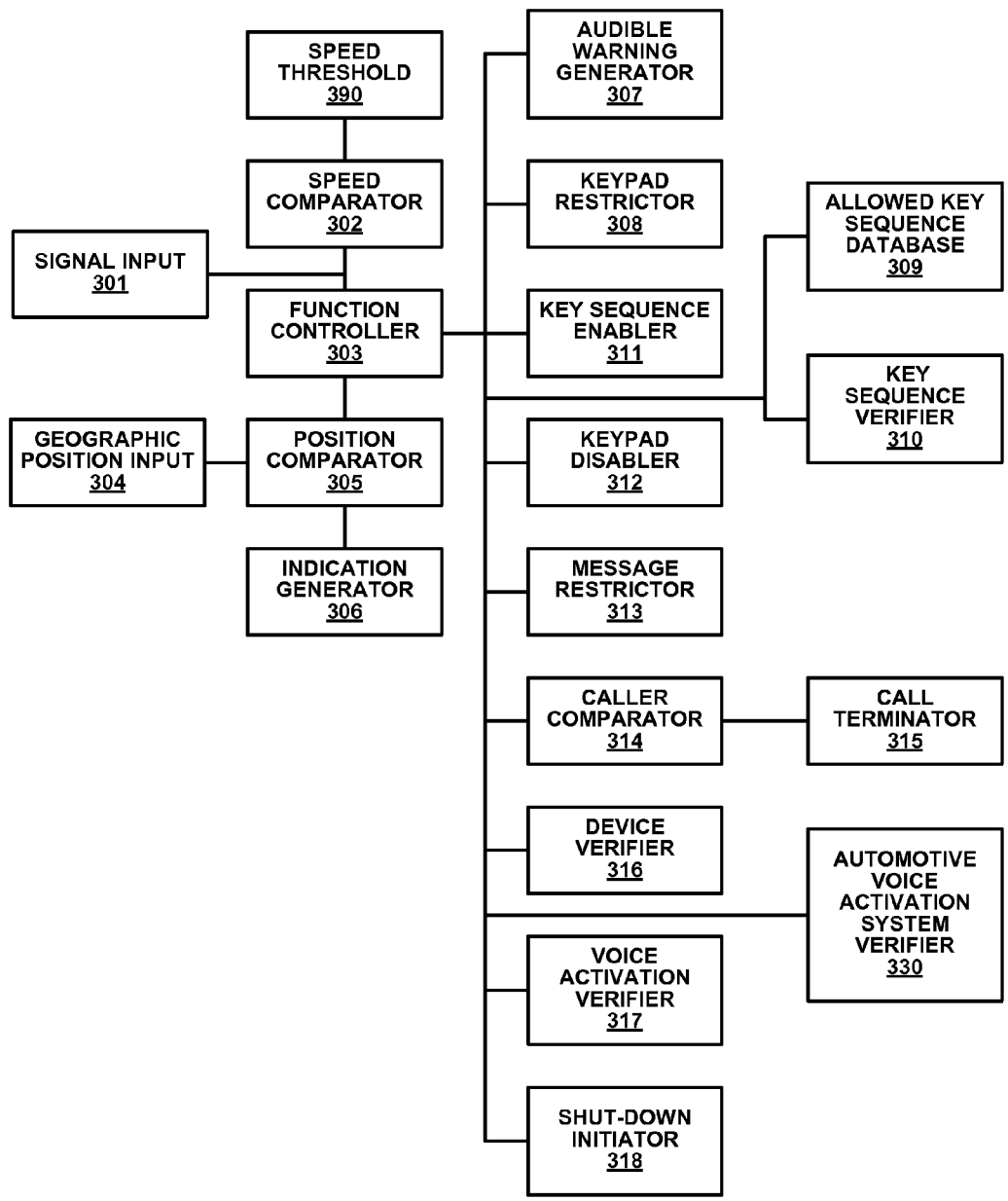
FIG. 3 is a block diagram of a control component utilized in accordance with embodiments of the present invention.

FIG. 3 is a block diagram of a control component 150 utilized in accordance with embodiments of the present invention. In the embodiment of FIG. 3, control component 150 comprises a signal input 301, a speed comparator 302 and a function controller 303. In one embodiment, signal input 301 receives a control signal from, for example, base station 510 or speed determiner 160. As discussed above, in one embodiment a control signal (e.g., 590) comprises an indication of the speed of mobile electronic device 100. In another embodiment, speed determiner 160 can generate a signal indicating the speed of mobile electronic device 100 which is received via signal input 301 and is accessed by speed comparator 302. Speed comparator 302 is configured to determine when the speed of mobile electronic device 100 exceeds a speed threshold (e.g., 390 of FIG. 3). For example, if speed threshold 390 is set at a speed of 8 miles per hour, it may be assumed that mobile electronic device 100 is being operated by a user in a moving vehicle when its speed exceeds 8 miles per hour. Alternatively, it may be assumed that the user of mobile electronic device 100 is engaged in an activity which requires a greater attention to safety. In one embodiment, when speed comparator 302 determines that the speed of mobile electronic device 100 exceeds speed threshold 390, it generates a control signal to function controller 303.

Function controller 303 is configured to restrict the functionality of mobile electronic device 100 based upon receiving a control signal which indicates that the speed of mobile electronic device 100 exceeds a speed threshold. In another embodiment, control signal 590 generated by base station 510 indicates that the speed of mobile electronic device 100 exceeds a speed threshold. Alternatively, speed determiner 160 of mobile electronic device 100 can generate a control signal when the speed of mobile electronic device 100 exceeds a speed threshold. It is noted that the control signal is not required to indicate the speed of mobile electronic device 100. In other words, the control signal simply indicates that the speed of mobile electronic device 100 exceeds a speed threshold.

In the embodiment of FIG. 3, control component 150 further comprises a geographic position input 304 which is coupled with position comparator 305. Geographic position input 304 receives a current geographic position of mobile electronic device 100 from either of base station 510 or position determiner 162. Position comparator 305 is for determining that the current geographic position of mobile electronic device 100 comprises a road. In one embodiment, position comparator 305 compares the current geographic position of mobile electronic device 100 with a map or database (not shown) which is stored upon mobile electronic device 100. An indication generator 306 is for generating and indication that the current geographic position of mobile electronic device 100 comprises a road. In one embodiment, the indication generated by indication generator 306 is used by function controller 303 to restrict the functionality of mobile electronic device 100.

In the embodiment of FIG. 3, control component 150 further comprises an audible warning generator 307. As described above with reference to FIG. 2, a variety of audible warnings and/or messages may be generated in accordance with the present invention to remind a user that they are operating mobile electronic device 100 in an unsafe manner. In one embodiment, the audible warning may prevent a user from operating mobile electronic device 100 in a satisfactory manner when the speed of mobile electronic device 100 exceeds a speed threshold.

In the embodiment of FIG. 3, control component 150 further comprises a keypad restrictor 308 for restricting the use of a keypad (e.g., alpha-numeric input device 107 of FIG. 1). As described above with reference to FIG. 2, embodiments of the present invention may prevent a user from using a keypad of mobile electronic device 100 in such a manner as to prevent using mobile electronic device 100 in a moving vehicle. As noted above, embodiments of the present invention may allow some functionality of the keypad such as allowing the dialing of emergency services (e.g., 911), approved speed dialing sequences, approved telephone numbers, or approved recipients of a phone call. Additionally, embodiments of the present invention may prevent a user from entering and/or sending text messages using keypad restrictor 308.

In the embodiment of FIG. 3, control component 150 further comprises an allowed key sequence database 309 and a key sequence verifier 310. Allowed key sequence database 309 is for storing an allowed key sequence. As described above, control component 150 can be configured such that only allowed key sequences are permitted to be dialed when the speed of mobile electronic device 150 exceeds a speed threshold. This can comprise, for example, a one digit or two digit speed dialing sequence, or the phone number of an approved party. Key sequence verifier 310 is for verifying that the key sequence entered by a user when the speed of mobile electronic device 100 exceeds a speed threshold comprises a key sequence stored in allowed key sequence database 309. In the embodiment of FIG. 3, control component 150 further comprises a key sequence enabler 311 for permitting the input key sequence which has been verified by key sequence verifier 310 to be entered using the keypad and executed by mobile electronic device 100.

In the embodiment of FIG. 3, control component 150 further comprises a keypad disabler 312 for disabling the keypad of mobile electronic device 100 entirely in response to determining that the speed of mobile electronic device 100 exceeds a speed threshold.

In the embodiment of FIG. 3, control component 150 further comprises a message restrictor 313 for restricting the use of mobile electronic device 100 to receiving incoming calls. In embodiments of the present invention, upon determining that the speed of mobile electronic device 100 exceeds a speed threshold, message restrictor 313 permits incoming telephone calls to be received. In one embodiment, message restrictor 313 is further operable for preventing an outgoing call from being made by mobile electronic device 100 while its speed exceeds a speed threshold.

In the embodiment of FIG. 3, control component 150 further comprises a caller comparator 314 and a call terminator 315. In embodiments of the present invention, caller comparator 314 is for determining whether an incoming call is from a permitted caller. There are a variety of methods for determining whether an incoming call is coming from a permitted caller in accordance with embodiments of the present invention. In one embodiment, control component 150 can compare the phone number of the incoming call to a stored database (not shown) to determine whether the incoming call is coming from a permitted caller. In embodiments of the present invention, call terminator 315 is for terminating an incoming telephone call if it is determined that the incoming call is not from a permitted originator.

In the embodiment of FIG. 3, control component 150 further comprises a device verifier 316 for verifying the use of a hands-free device to operate mobile electronic device 100. As described above with reference to FIG. 2, in one embodiment if a user is not using a hands-free device (e.g., headset 120, or automotive Bluetooth® system 130 of FIG. 1), function controller 303 will restrict the functionality of mobile electronic device 100. In one embodiment, device verifier 316 does not require the use of a hands-free device unless the speed of mobile electronic device 100 exceeds a speed threshold.

In the embodiment of FIG. 3, control component 150 further comprises a voice activation verifier 317 for verifying the use of a voice activation system to utilize mobile electronic device 100. In one embodiment of the present invention, voice activation verifier 317 does not verify the use of a voice activation system unless the speed of mobile electronic device 100 exceeds a speed threshold. In embodiments of the present invention, if a voice activation system is not used when the speed of mobile electronic device 100 exceeds a speed threshold, function controller 303 will restrict the functionality of mobile electronic device 100.

In the embodiment of FIG. 3, control component 150 further comprises a shut-down initiator 318 for initiating a shut down sequence of mobile electronic device 100 if its speed exceeds a speed threshold. It is noted that embodiments in accordance with the present invention may comprise more components than discussed above, or may comprise fewer than discussed with reference to FIG. 3.

In the embodiment of FIG. 3, control component 150 further comprises an automotive voice activation system verifier 330. In one embodiment of the present invention, automotive voice activation system verifier 330 is for verifying that an automotive voice activation system is being used to control mobile electronic device 100. In one embodiment, automotive voice activation system verifier 330 verifies that a Bluetooth® based automotive voice activation system (e.g., automotive Bluetooth® system 130) is communicatively coupled with mobile electronic device 100. Additionally, in accordance with embodiments of the present invention, the use of one or more of the above mentioned components is a configurable option when enabling control component 150. For example, in one embodiment a user can configure control component 150 such that function controller 303 utilizes keypad disabler 312 in response to determining that the speed of mobile electronic device 100 exceeds a speed threshold. In another embodiment, a user can configure control component 150 such that function controller 303 utilizes shut-down initiator 318 in response to determining that the speed of mobile electronic device 100 exceeds a speed threshold. Similarly, control component 150 can be configured such that function controller 303 utilizes audible warning generator 307, keypad restrictor 308, key sequence enabler 311, key sequence verifier 310, allowed key sequence database 309, message restrictor 313, caller comparator 314, call terminator 315, device verifier 316, voice activation verifier 317, automotive voice activation system verifier 330, or a combination thereof.

In various embodiments, a control component resident in a mobile electronic device is implemented in response to receiving an indication to limit operating a mobile electronic device in a moving vehicle. As described above, in one embodiment an indication to limit an operation of mobile electronic device 100 is voluntary. For example, a parent configuring mobile electronic device 100 to utilize control component 150 when purchasing it for a child. In another example, a user may elect to utilize control component 150 in order to receive a rate discount from an insurance company. In another embodiment, control component 150 may be utilized by, for example, a cellular telephone manufacturer or service provider in order to unilaterally limit the use of cellular telephones by people operating a vehicle. In another embodiment, control component 150 may be implemented in order to comply with a mandated requirement to limit cell phone use by people operating vehicles.

In one embodiment, a position determining component disposed within the mobile electronic device is used to determine the speed of the mobile electronic device. As discussed above with reference to FIG. 1, embodiments of the present invention utilize a position determining component which is disposed within a mobile electronic device (e.g., position determining component 112 of FIG. 1). This is possible in part due to the increasing integration of position determining components within mobile electronic devices such as cellular telephones, PDAs and the like.

In one embodiment, it is determined that the speed of the mobile electronic device exceeds a speed threshold. As described above, in embodiments of the present invention control component 150 compares the current speed of mobile electronic device 100 with speed threshold 390 to determine whether mobile electronic device 100 is being operated in a moving vehicle.

In one embodiment, the functionality of the mobile electronic device is restricted based upon determining that its speed exceeds the speed threshold. As discussed above, in embodiments of the present invention if it is determined that the speed of mobile electronic device 100 exceeds speed threshold 390, function controller 303 will restrict the functionality of mobile electronic device 100. In embodiments of the present invention, this may comprise shutting down mobile electronic device 100, or restricting its operation such that a user will find it inconvenient to continue using mobile electronic device 100. As a result, the user will be encouraged to pull their vehicle off of the road to continue using mobile electronic device 100, or to use it later.

Figure 4:
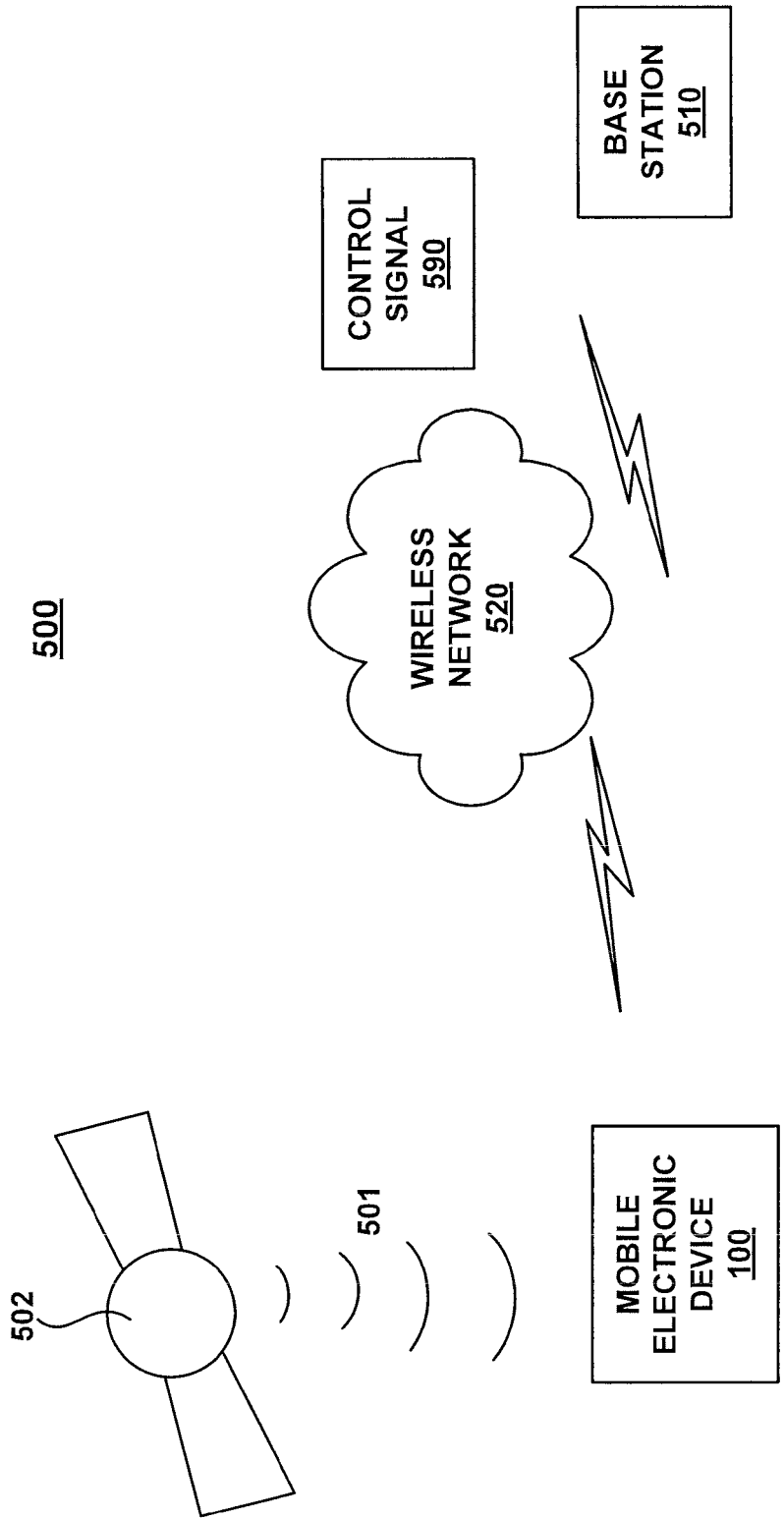
FIG. 4 shows a communication system and base station in accordance with an embodiment of the present invention.

Communication System and Wireless Communication Device with Speed Regulated Functionality FIG. 4 shows a communication system 500 and base station 510 in accordance with embodiments of the present invention. In FIG. 4, mobile electronic device 100 receives GNSS signals 501 from a plurality of Global Navigation Satellite System (GNSS) satellites 502. GNSS refers to a number of satellite navigation systems that provide global geo-spatial positioning data which permits electronic devices to determine their geographic position (e.g., latitude, longitude, and altitude) with great precision. Satellite systems included in the GNSS include, but are not limited to: the Global Positioning System (GPS), Galileo, GLONASS, Beidou, and IRNSS navigation systems which are currently, or are soon to be, implemented. In one embodiment, mobile electronic device 100 receives geo-spatial positioning data from a pseudolite which is a technology well known in the art. With reference to the GPS system, each satellite in orbit transmits signals on two frequencies, the L1 frequency and the L2 frequency. Using spread spectrum techniques, a course acquisition (C/A) pseudo-random noise (PRN) code is transmitted on the L1 frequency, and a precise (P) code, which is only available to authorized military and civilian users, is transmitted on the L2 frequency. Each satellite has a unique C/A code which is used to identify a particular satellite and either the C/A code or the P code can be used to determine the distance between a receiver and the satellite. Additionally, each satellite transmits GPS system time, ephemeris data, and almanac data. The receiver detects the time difference between when a signal is received from a satellite and the time the satellite actually broadcasts the signal to determine the distance between the receiver and the satellite. The ephemeris data is used to determine the satellite's position when the signal was broadcast. In embodiments of the present invention, this functionality can be performed by GNSS system 112 of FIG. 1.

Also shown in FIG. 4 is a cellular base station 510 with which mobile electronic device 100 is communicatively coupled via a wireless network 520. In the following description, mobile electronic device 100 will be described as a cellular telephone while wireless network 520 and cellular base station 510 are described as a cellular network and a cellular base station respectively. However, it is noted that embodiments of the present invention are not limited to cellular communication networks and/or cellular base stations alone. Instead, the description of a cellular network and a cellular base station are used to clearly describe one embodiment of the present invention. A cellular base station typically utilizes one or more antennas, transceivers, control electronics, a GPS receiver, and signal processors which facilitate cellular communications in the region proximate to the cellular base station. It is noted that while the present description is directed toward cellular telephones and similar electronic devices, embodiments of the present invention are well suited for controlling an operation of other devices and/or machinery as well.

Figure 5:
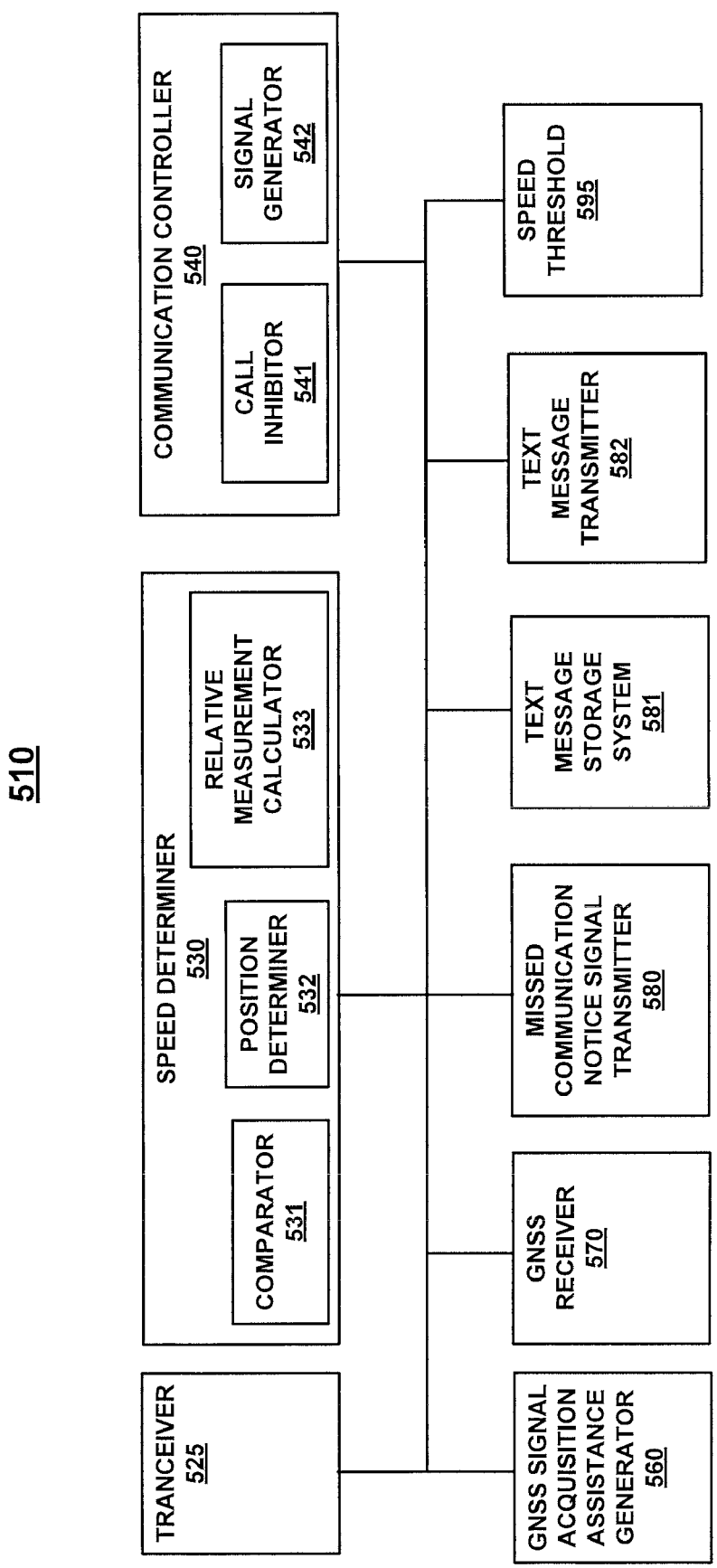
FIG. 5 is a block diagram of components of base station in accordance with an embodiment of the present invention.

FIG. 5 shows components of cellular base station 510 in accordance with an embodiment of the present invention. In FIG. 5, cellular base station 510 comprises a wireless communication transceiver 525, a speed determiner 530, a communication controller 540, a GNSS signal acquisition assistance generator 560, a GNSS receiver 570, and a speed threshold 595. It is noted that some components typically found in a cellular base station have been omitted for brevity. Additionally, it is noted that the functionality of separate devices described in FIG. 5 may be integrated in embodiments of the present invention. In the embodiment of FIG. 5, speed determiner 530 further comprises a comparator 531, a position determiner 532, and a relative measurement calculator 533. Furthermore, in the embodiment of FIG. 5, communication controller 540 comprises a call inhibitor 541 and a signal generator 542 which will be described in greater detail below.

In one embodiment, cellular base station 510 monitors the speed of mobile electronic device 100 and determines when the speed of mobile electronic device 100 exceeds a predetermined speed threshold 595. In embodiments of the present invention, a speed threshold 595 is established which is used by speed determiner 530 to determine if mobile electronic device 100 is being operated while in a moving vehicle. For example, the speed threshold 595 of mobile electronic device 100 can be set at 8 miles per hour. Thus, if it is determined that mobile electronic device 100 has a speed of 9 miles per hour, it may be assumed that it is being operated in a moving vehicle. It is noted that the speed threshold 595 may be set higher or lower than 8 miles per hour in embodiments of the present invention. More generally, the speed threshold 595 set for mobile electronic device 100 will be set higher than the normal walking or running speed of a human in order to be able to establish that mobile electronic device 100 is being operated in a moving vehicle, or at a speed at which it is desirable that the user not be distracted by operating mobile electronic device 100. Upon determining that the speed of mobile electronic device 100 exceeds the speed threshold 595, cellular base station 510 can initiate controlling an operation of mobile electronic device 100. In so doing, cellular base station 510 can prevent a user of mobile electronic device 100 from making, or receiving a telephone call while the speed of mobile electronic device exceeds the speed threshold 595. In one embodiment, cellular base station 510 can block outgoing calls from mobile electronic device 100 when its speed exceeds the speed threshold 595. Thus, a user of mobile electronic device 100 will not be able to initiate a telephone call and will not be distracted while operating a vehicle or other device. Additionally, cellular base station 510 may optionally block incoming calls destined for mobile electronic device 100.

In another embodiment, signal generator 542 of cellular base station 510 generates an offline control signal 590 to mobile electronic device 100 which indicates to control component 150 that the speed of mobile electronic device 100 exceeds the speed threshold 595. For example, base station 510 may generate control signal 590 which indicates that the speed of mobile electronic device 100 exceeds speed threshold 595. In response, mobile electronic device may generate an audible signal or display a message on display device 106 indicating that operation of mobile electronic device is not permitted based upon the current speed. In one embodiment, the control signal 590 indicates that the speed of mobile electronic device 100 exceeds speed threshold 595. In one embodiment, the control signal 590 conveys the speed of mobile electronic device 100. Control component 150 then determines that the speed of mobile electronic device 100 exceeds speed threshold 390 and controls an operation in response.

For the purposes of the present invention, the term "offline" refers to a message of communication which is not initiated by or intended for a user of mobile electronic device. For example an online signal may comprise a telephone conversation or data that is intended by the customer or consumer. In contrast, an offline signal may comprise a system control signal, a handshaking sequence of signals, remote monitoring signals, system assistance to the remote, and status from the remote to the system where the offline signal is transmitted and received without any requirement that the user is aware of the transmission or reception. In other words, cellular base station 510 generates a message or signal which is received by mobile electronic device 100 without the intervention of the user of mobile electronic device 100. In response to the offline control signal 590, control component 150 may restrict the functionality of mobile electronic device 100 as described above with reference to FIG. 3. In other words, based upon a control signal 590 from cellular base station 510, mobile electronic device 100 may restrict its operation such that an outgoing, or incoming, cellular telephone call is inhibited while the speed of mobile electronic device 100 is above a speed threshold 595. In so doing, embodiments of the present invention can prevent a user from operating a cellular telephone while operating a vehicle. Embodiments of the present invention are advantageous in that much of the resource intensive operations can be performed by cellular base station 510, thus speeding the process of determining the position of mobile electronic device 100. Additionally, battery power of mobile electronic device 100 can be conserved utilizing embodiments of the present invention.

In one embodiment, cellular base station 510 further comprises a missed communication notice signal transmitter 580 which is configured for generating a missed communication notice signal when it is determined that the speed of mobile electronic device 100 has been below speed threshold 595 for a predetermined time period. In one embodiment, this comprises cellular base station 510 making at least one measurement of the speed of mobile electronic device 100 which is below speed threshold 595. In one embodiment, a plurality of measurements of the speed of mobile electronic device 100 which are below speed threshold 595 are needed to determine that its speed has been below speed threshold 595 for a sufficient time period. In one embodiment, when the speed of mobile electronic device 100 has been below speed threshold 595 for a sufficient time period, missed communication notice signal transmitter 580 the missed communication notice signal configured to provide notification to mobile electronic device 100 that a communication was missed.

In one embodiment, cellular base station 510 further comprises a text message storage system 581 for storing a text message destined for mobile electronic device 100. In one embodiment, cellular base station 510 stores text messages destined for mobile electronic device 100 when it has been determined that the speed of mobile electronic device 100 exceeds speed threshold 595. In one embodiment, cellular base station 510 further comprises a text message transmitter 582 is configured for transmitting a stored text message addressed to mobile electronic device 100 when it has been determined that its speed has been below speed threshold 595 for a predetermined period of time.

FIGS. 6A, 6B, 6C, and 6D are flowcharts showing sequences of events performed by a communication system in accordance with embodiments of the present invention. As stated above, in one embodiment mobile electronic device 100 comprises a cellular telephone. It is again noted that while the following description is in terms of a cellular telephone network, embodiments of the present are not limited to cellular telephones or cellular networks in general. Typically, when a cellular telephone is first powered on, it is not receiving and/or transmitting an online message. The cellular telephone contacts a cellular base station (e.g., cellular base station 510 of FIG. 5) and a series of offline (e.g., not initiated by the cellular telephone user) communications are exchanged between the cellular telephone and the cellular base station within range of the cellular telephone. These communications typically exchange the electronic serial number of the cellular telephone, the mobile identification number (e.g., telephone number) associated with the cell phone, and a five-digit system identification code. This information is conveyed via the cellular base station to the mobile telephone exchange which connects the cellular telephone with the PTSD telephone system. Again, these communications take place automatically when the cellular telephone is powered on without any other initiation or intervention by the cellular telephone user.

Figure 6A:
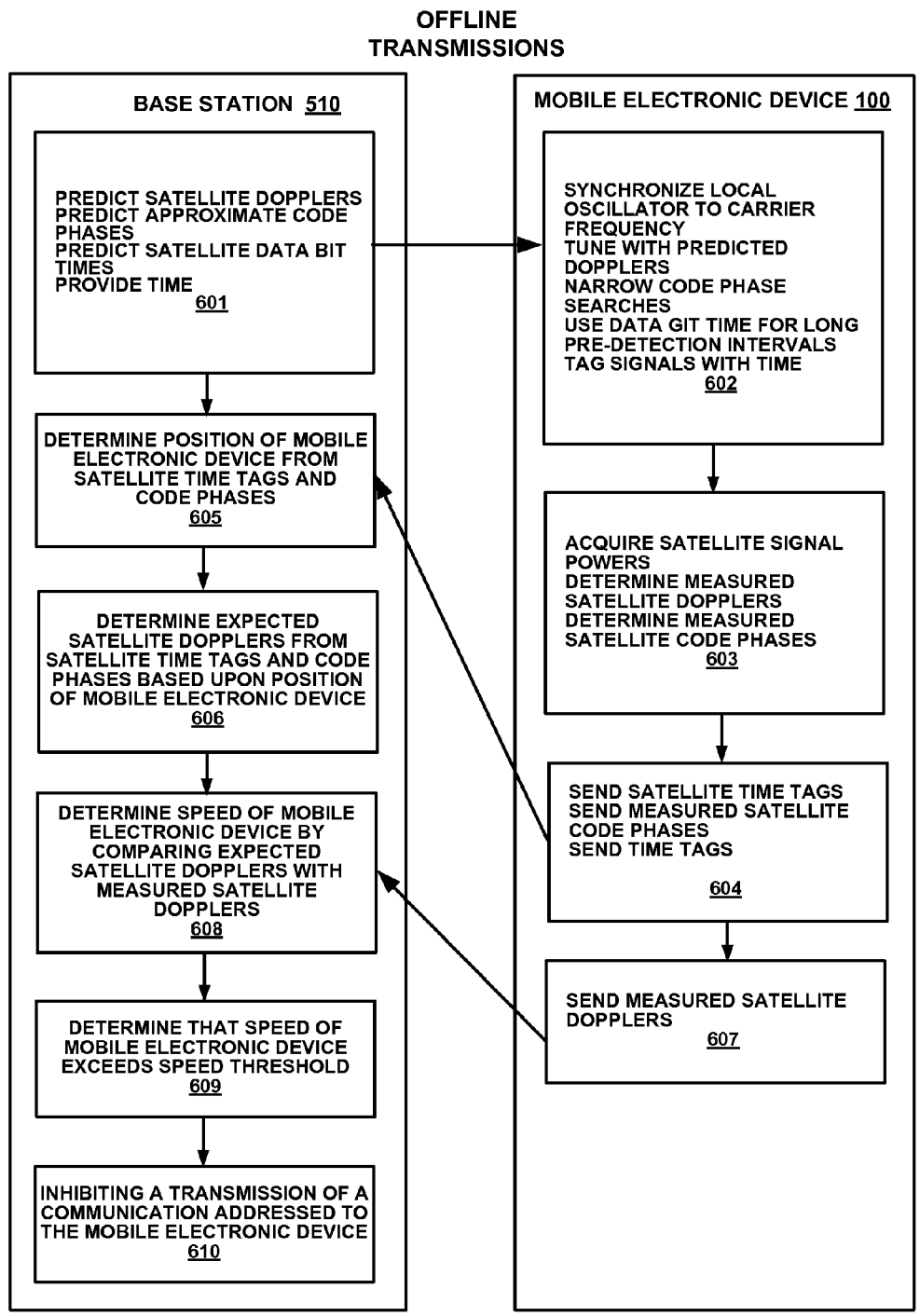
FIGS. 6A, 6B, 6C and 6D are flowcharts showing sequences of events performed by a communication system in accordance with embodiments of the present invention.

In operation 601, cellular base station 510 generates a set of predicted GNSS satellite Dopplers, predicted GNSS code phases, GNSS data bit times, and the current time (e.g., the GNSS clock time) which are then sent to mobile electronic device 100 in an offline message. In contrast to a typical cellular telephone initiation sequence, embodiments of the present invention also send GNSS signal acquisition assistance data to mobile electronic device 100 automatically as well. In the example of FIG. 6A, this may comprise, but is not limited to, the predicted GNSS Doppler frequency shifts, predicted approximate GNSS code phase offsets, and GNSS satellite data bit times as measured at cellular base station 510 using GNSS receiver 570 as well as the current GNSS clock time. It is noted that embodiments of the present invention may also send additional GNSS data such as carrier frequencies, satellite positions and clock information, ephemeris data, and adjustment data for correcting signal distortion due to ionospheric or tropospheric effects. The carrier frequency assistance may be performed by phase or frequency locking a local oscillator in the mobile electronic device 100 to a carrier or other stable frequency, or a frequency related by M/N to a carrier frequency or other stable frequency, of the communication signal transmitted from the system 500.

Embodiments of the present invention utilize Assisted-GPS (A-GPS) technology to facilitate the process of determining the position of mobile electronic device 100. A-GPS is a system in which outside sources provide a GPS receiver with data permitting the receiver to find GPS satellite signals more readily than can be done on a stand alone basis. The data is derived from a GNSS receiver which is proximate to the GNSS receiver which receives the A-GPS data. Because of the proximity of the two GNSS receivers, GNSS signal data such as code phase offsets, Doppler frequency shifts, etc., as well as locally signal errors due to atmospheric or physical conditions should be approximately the same for both receivers. By sending this information to a remote GNSS receiver, the time to fix and track GNSS satellites is greatly reduced for the recipient of this data. The A-GPS system is widely used to comply with the wireless E911 standard which mandated that cellular telephone position information be made available to emergency call dispatchers because it permits a cellular telephone to generate a position fix quicker than if an autonomous position fix was being generated.

Because GPS, and other GNSS navigation systems, rely upon a plurality of satellites which broadcast a unique code, GNSS receivers must determine which codes are being received at a particular location. The receiver must correlate the received C/A code with a stored version and then determine a time delay between when the C/A code was broadcast and when it was received by the receiver. Because the satellite is constantly moving with reference to the receiver, a Doppler shift of the frequency of the C/A code is encountered which can hinder acquisition of the satellite signals because the receiver has to search for the frequency of the C/A code. As a result, it can take minutes for a GPS receiver to create an initial position fix autonomously.

A-GPS was developed to overcome the difficulties in acquiring a signal and to speed the time it takes a receiver to generate a position fix. Due to the proximity of the GPS receiver at the cellular base station to the location of a cellular telephone, the GNSS Dopplers, GNSS code phases, and satellite bit times at the cellular base station (e.g., 510 of FIG. 4) should closely approximate those of the location of the cellular telephone (e.g., mobile electronic device 100). Thus, by providing this information to the GPS receiver in the cellular telephone, the GPS receiver can acquire and track satellites better and realize an increase in signal sensitivity.

In operation 602 of FIG. 6A, GNSS system 112 of mobile electronic device 100 uses the GNSS signal acquisition assistance data to more quickly acquire the satellites within view. As described in FIG. 6A, this includes, but is not limited to, synchronizing local oscillators to the desired carrier frequencies, tuning with the predicted Dopplers to account for frequency shift due to the relative motion of the satellite and GNSS system 112, and narrowing the code phase searches based upon the predicted GNSS code phases sent from the cellular base station 510. GNSS system 112 may further use a GPS time estimate for GPS data bit timing, pre-detection interval timing, generating a clock time tag for a GNSS signal, and for linearizing pseudoranges to satellites. It is noted that in one embodiment, Assisted-GPS data is not required for mobile electronic device 100 to determine its position. However, in one embodiment the use of Assisted-GPS data is beneficial in reducing the time to first fix for mobile electronic device 100.

In operation 603 of FIG. 6A, GNSS system 112 acquires satellite signal powers, measures the Doppler shift of the GNSS signal frequency, and determines measured GNSS code phase offsets. Typically, GNSS system 112 utilizes a search algorithm which increments code phases of the received C/A signal to acquire signal power. When a high correlation value between a given phase of the C/A signal stored locally and the received C/A signal is discovered, it indicates that signal power has been found. GNSS system 112 can then measure the Doppler frequency shifts of received signals due to motion of a satellite (e.g., 502 of FIG. 4) relative to mobile electronic device 100. For the purposes of the present invention, the terms "GNSS Doppler frequency shift measurement," and "measured GNSS code phase offsets" refer to GNSS Doppler frequency shifts and satellite code phase offsets measured at the location of mobile electronic device 100. Typically, these measurements are made by mobile electronic device 100 itself although that is not a requirement in embodiments of the present invention.

In operation 604 of FIG. 6A, mobile electronic device 100 sends GNSS time tags, GNSS Doppler frequency shift measurements, and measured GNSS code phase offsets to the cellular base station 510. In one embodiment, mobile electronic device 100 may send the satellite code phase offsets to the cellular base station (e.g., 510) in an offline message. In embodiments of the present invention, the cellular base station 510 uses this data to determine the position and speed of mobile electronic device 100 when it is in motion. In embodiments of the present invention, the sending of A-GPS data to mobile electronic device 100 and the receiving of raw, or processed, data from mobile electronic device 100 is performed periodically based upon a pre-determined time interval. This facilitates monitoring the speed of mobile electronic device 100 for as long as it is powered on.

In operation 605 of FIG. 6A, the cellular base station 510 uses position determiner 532 to determine the position of mobile electronic device 100 based upon the measured GNSS time tags and measured GNSS code phase offsets sent by mobile electronic device 100. Embodiments of the present invention utilize methods well known in the art to determine the location of an object based upon GPS code phase and GNSS time tags received at the location of the object. Advantageously, the cellular base station (e.g., 510) can utilize greater computing resources to determine the location of mobile electronic device 100 than are available to mobile electronic device 100 itself.

In operation 606 of FIG. 6A, the expected GNSS Doppler frequency shift measurements are determined based upon the position of mobile electronic device 100. In embodiments of the present invention, the cellular base station determines what the expected Doppler frequency shift should be for received GNSS signals if mobile electronic device 100 were stationary. In other words, the expected Doppler frequency shifts account for the frequency shift incurred due to the motion of the GNSS satellites alone.

In operation 607 of FIG. 6A, measured satellite Doppler frequency shifts are sent from mobile electronic device 100 to base station 510. Due to the relative motion of the navigation satellites relative to mobile electronic device 100, a Doppler frequency shift occurs. This is due in part to the motion of the orbiting navigation satellite and would occur whether mobile electronic device 100 is moving or not. Additionally, some Doppler frequency shift occurs when mobile electronic device 100 is moving. In the embodiment of FIG. 6A, the Doppler frequency shifts measured by GNSS system 112 of mobile electronic device 100 are sent to base station 510.

In operation 608 of FIG. 6A, the speed of mobile electronic device 100 is determined based upon a comparison of the expected GNSS Doppler frequency shifts and the GNSS Doppler frequency shift measurements received from mobile electronic device 100. In embodiments of the present invention, base station 510 uses speed determiner 530 to determine the speed of GNSS system 112, and therefore of mobile electronic device 100.

Satellite line-of-sight (LOS) vectors (e.g., losE, losN, and losU) for the satellite vehicles 502 are calculated between the position of the mobile electronic device 100 and the locations-in-space of the satellites 502 where the locations-in-space are determined from the orbital parameters (e.g., ephemeris or almanac) and GNSS time. The orbital parameters are carried in the data bits of a GNSS message. Each Doppler frequency shift is equivalent by constants to a rate of change in the distance (e.g. range rate) between the satellite 502 and mobile electronic device 100.

In one embodiment, the speed of mobile electronic device 100 is determined using vector analysis. For example, in one embodiment mobile electronic device 100 measures the Doppler frequency shifts (e.g., measured ☐fDopplerSV#) in the signals 501 from the satellite vehicles 502. The measured Dopplers are converted using the SV LOS vectors with vector arithmetic into a measured relative velocity vector. The measured relative velocity vector has 3 dimensions for the velocity of mobile electronic device 100 for the actual motion of mobile electronic device 100 relative to the satellites 502 and a 4th dimension for a frequency error that is common to the four Doppler measurements.

The base station 510 calculates the expected Doppler frequency shifts (e.g., expected ☐fDopplerSV#) for the signals 501 from the same satellite vehicles 502 with the assumption that mobile electronic device 100 is stationary. (In another embodiment the expected Dopplers are calculated in mobile electronic device 100). The expected Dopplers are converted using the SV LOS vectors with vector arithmetic into an expected relative velocity vector having the same 3 dimensions for the velocity (but generally different dimensional values) of mobile electronic device 100 relative to the satellites 502 where mobile electronic device 100 is assumed to be stationary, and the fourth dimension for the frequency error in the measurements. The expected relative velocity vector is subtracted from the measurement relative velocity vector to determine the vector velocity of the motion of mobile electronic device 100. The difference of these two relative vectors can be attributed to the motion of mobile electronic device 100 alone.

In one embodiment, comparator 531 compares the expected GNSS Doppler frequency shifts with the GNSS Doppler frequency shift measurements received from mobile electronic device 100. A comparison of these values can indicate the motion of mobile electronic device 100 itself independent of the motion of the GNSS satellites. In other words, a difference of the expected GNSS Doppler frequency shift and the GNSS Doppler frequency shift measurement from mobile electronic device 100 is due to motion of mobile electronic device 100. An example of calculating the speed of mobile electronic device 100 in accordance with one embodiment of the present invention is shown below.

$$\text{Receiver Velocity Vector} - \begin{bmatrix} v_E \\ v_N \\ v_U \\ (\Delta f/f)C \end{bmatrix} =$$

$$\text{Inverse Line-of-sight Vector Matrix} \begin{bmatrix} los_{E,SV1}, los_{N,SV1}, los_{U,SV1}, 1 \\ los_{E,SV2}, los_{N,SV2}, los_{U,SV2}, 1 \\ los_{E,SV3}, los_{N,SV3}, los_{U,SV3}, 1 \\ los_{E,SV4}, los_{N,SV4}, los_{U,SV4}, 1 \end{bmatrix}^{-1} \times$$

$$\text{Measured Range Rate Vector} \begin{bmatrix} \Delta(RR^{measured}_{SV1}) \\ \Delta(RR^{measured}_{SV2}) \\ \Delta(RR^{measured}_{SV3}) \\ \Delta(RR^{measured}_{SV4}) \end{bmatrix}$$

From the measured receiver velocity vector above (e.g., the product of the inverse line-of-sight vector matrix and the measured range rate vector), the expected receiver velocity vector (shown below) is subtracted.

$$\text{Inverse Line-of-sight Vector Matrix} - \begin{bmatrix} los_{E,SV1}, los_{N,SV1}, los_{U,SV1}, 1 \\ los_{E,SV2}, los_{N,SV2}, los_{U,SV2}, 1 \\ los_{E,SV3}, los_{N,SV3}, los_{U,SV3}, 1 \\ los_{E,SV4}, los_{N,SV4}, los_{U,SV4}, 1 \end{bmatrix}^{-1} \times$$

$$\text{Expected Range Rate Vector} \begin{bmatrix} (RR^{expected}_{SV1}) \\ (RR^{expected}_{SV2}) \\ (RR^{expected}_{SV3}) \\ (RR^{expected}_{SV4}) \end{bmatrix}$$

It is noted that the ones are added to the inverse line-of-sight vector matrices to create a 4×4 matrix. Matrix arithmetic is then used to resolve the 4D velocity vector ($V_E$, $V_N$, $V_U$, and ($\Delta f/f$)/C). In the above example, the speed of mobile electronic device $100 = \sqrt{(V_E^2, V_N^2, V_U^2)}$, or approximately $\sqrt{(V_E^2, V_N^2)}$ as the velocity up ($V_U$) will typically not contribute greatly to the determination of the speed of GNSS system 112. For example, an error of less than 0.5% occurs at a 6% grade using $\sqrt{(V_E^2, V_N^2)}$ as the velocity of mobile electronic device 100.

An example of calculating the speed of mobile electronic device 100 using 3 SVs in accordance with one embodiment of the present invention is shown below.

$$\begin{bmatrix} v_E \\ v_N \\ (\Delta f/f)C \end{bmatrix} = \begin{bmatrix} los_{E,SV1}, los_{N,SV1}, 1 \\ los_{E,SV2}, los_{N,SV2}, 1 \\ los_{E,SV3}, los_{N,SV3}, 1 \end{bmatrix}^{-1} \times \begin{bmatrix} \Delta(RR^{measured}_{SV1}) \\ \Delta(RR^{measured}_{SV2}) \\ \Delta(RR^{measured}_{SV3}) \end{bmatrix}$$

From the receiver velocity vector above, the expected receiver velocity vector (shown below) is subtracted.

$$\text{Inverse Line-of-sight Vector Matrix} \begin{bmatrix} los_{E,SV1}, los_{N,SV1}, 1 \\ los_{E,SV2}, los_{N,SV2}, 1 \\ los_{E,SV3}, los_{N,SV3}, 1 \end{bmatrix}^{-1} \times$$

$$\text{Expected Range Rate Vector} \begin{bmatrix} (RR^{expected}_{SV1}) \\ (RR^{expected}_{SV2}) \\ (RR^{expected}_{SV3}) \end{bmatrix}$$

In the above example, the 2-dimensional speed of mobile electronic device $100 = \sqrt{(V_E^2, V_N^2)}$. Again, an error of less than 0.5% occurs at a 6% grade using $\sqrt{(V_E^2, V_N^2)}$ as the velocity of mobile electronic device 100. It is noted that the operations described above may also be performed by mobile electronic device 100 itself using speed determiner 160.

In one embodiment, the use of vectors to determine the speed of mobile electronic device 100 is not a requirement. Instead, a range rate which is a scalar value proportional to the Doppler frequency shift, is used to determine the speed of mobile electronic device 100. In other words, the GNSS Doppler frequency shift measurement from mobile electronic device 100 is converted to a measured range rate using some constant factor(s). In one embodiment, the calculation of a plurality of measured range rates corresponding to a plurality of GNSS Doppler frequency shift measurements, and calculating a plurality of expected range rates between mobile electronic device 100 and a plurality of GNSS satellites, is performed by relative measurement calculator 533.

As an example, in one embodiment, an SV line-of-sight vector (LOS) (e.g., $los_E$, $los_N$, and $los_U$) in a east/north/up coordinate system is calculated between a location-in-space of a navigation satellite (e.g., 502 of FIG. 4) and the approximate position of mobile electronic device 100. Component directions are E for east, N for north, and U for up. It is noted that other component directions known in the arts may be used including, but not limited to, an X, Y, Z coordinate system, an earth-centered coordinate system, etc. The LOS vector is also called the unit vector or directional cosine.

An expected range rate ($RR^{expected}_{SV\#}$) is calculated by taking the dot product of the LOS and velocity-in-space of the SV. The expected range rate is a scalar value. The term "relative" encompasses the relative motion between the SV (e.g., 502 of FIG. 4) and mobile electronic device 100 as well as relative according to a constant factor. For example, the expected range rate is relative by a constant factor to an expected Doppler frequency shift at the geographic position of mobile electronic device 100. In one embodiment, the constant factor may comprise the speed of light (C), meters per second, or another value.

In one embodiment, comparator 531 is configured to compare the measured range rates with the expected range rates to determine the speed of mobile electronic device 100. A range rate difference is calculated as the difference between the measured range rate ($RR^{measured}_{SV\#}$) at the position of mobile electronic device 100 and the expected range rate ($RR^{expected}_{SV\#}$) if mobile electronic device 100 were stationary at that position (e.g., $RR^{measured}_{SV\#} - RR^{expected}_{SV\#}$). The difference between these values is attributable to the motion of mobile electronic device 100.

In one embodiment, the 3-dimensional velocity (e.g., E, N, and U) of mobile electronic device 100 is calculated as well as the GPS receiver clock error ($\Delta f/f$) by resolving 4 unknowns (e.g., $V_E, V_N, V_U$, and ($\Delta f/f$)/C) with 4 equations for 4 SVs. It is noted that the range rate can be carried out proportionally using Dopplers in place of range rates, or with the constant C, or with several placements of other constant factors. An example of calculating the speed of mobile electronic device 100 in accordance with one embodiment of the present invention is shown below.

$$\text{Receiver Velocity Vector}\begin{bmatrix} v_E \\ v_N \\ v_U \\ (\Delta f/f)C \end{bmatrix} =$$

$$\text{Inverse Line-of-sight Vector Matrix}\begin{bmatrix} los_{E,SV1}, los_{N,SV1}, los_{U,SV1}, 1 \\ los_{E,SV2}, los_{N,SV2}, los_{U,SV2}, 1 \\ los_{E,SV3}, los_{N,SV3}, los_{U,SV3}, 1 \\ los_{E,SV4}, los_{N,SV4}, los_{U,SV4}, 1 \end{bmatrix}^{-1} \times$$

$$\text{Relative Range Rate Vector}\begin{bmatrix} \Delta(RR^{measured}_{SV1} - RR^{expected}_{SV1}) \\ \Delta(RR^{measured}_{SV2} - RR^{expected}_{SV2}) \\ \Delta(RR^{measured}_{SV3} - RR^{expected}_{SV3}) \\ \Delta(RR^{measured}_{SV4} - RR^{expected}_{SV4}) \end{bmatrix}$$

It is noted that the ones are added to the inverse line-of-sight vector matrix to create a 4×4 matrix. Matrix arithmetic is then used to resolve the 4D velocity vector ($V_E, V_N, V_U$, and ($\Delta f/f$)/C). In the above example, the speed of mobile electronic device $\mathbf{100} = \sqrt{(V_E^2, V_N^2, V_U^2)}$, or approximately $\sqrt{(V_E^2, V_N^2)}$ as the velocity up ($V_U$) will typically not contribute greatly to the determination of the speed of GNSS system 112. For example, an error of less than 0.5% occurs at a 6% grade using $\sqrt{(V_E^2, V_N^2)}$ as the velocity of mobile electronic device 100.

An example of calculating the speed of mobile electronic device 100 using 3 SVs in accordance with one embodiment of the present invention is shown below.

$$\text{Receiver Velocity Vector}\begin{bmatrix} v_E \\ v_N \\ (\Delta f/f)C \end{bmatrix} =$$

$$\text{Inverse Line-of-sight Vector Matrix}\begin{bmatrix} los_{E,SV1}, los_{N,SV1}, 1 \\ los_{E,SV2}, los_{N,SV2}, 1 \\ los_{E,SV3}, los_{N,SV3}, 1 \end{bmatrix}^{-1} \times$$

$$\text{Relative Range Rate Vector}\begin{bmatrix} \Delta(RR^{measured}_{SV1} - RR^{expected}_{SV1}) \\ \Delta(RR^{measured}_{SV2} - RR^{expected}_{SV2}) \\ \Delta(RR^{measured}_{SV3} - RR^{expected}_{SV3}) \end{bmatrix}$$

In the above example, the 2-dimensional speed of mobile electronic device $\mathbf{100} = \sqrt{(V_E^2, V_N^2,)}$. Again, an error of less than 0.5% occurs at a 6% grade using $\sqrt{(V_E^2, V_N^2)}$ as the velocity of mobile electronic device 100. It is noted that the operations described above may also be performed by mobile electronic device 100 itself using speed determiner 160.

In operation 610 of FIG. 6A, an operation of mobile electronic device 100 is controlled when its speed is determined to exceed a pre-determined speed threshold 595. More specifically, in the embodiment of FIG. 6A call inhibitor 541 prevents outgoing calls originating from mobile electronic device 100 in operation 610. Call inhibitor 541 may additionally block incoming calls destined for mobile electronic device 100 in response to this signal. In one embodiment, when the speed of mobile electronic device 100 exceeds a speed threshold 595, an incoming call destined for mobile electronic device 100 is automatically routed to a voice mail account of mobile electronic device 100. Alternatively, a text message destined for mobile electronic device 100 is stored at cellular base station 510. In one embodiment of the present invention, signal generator 542 is used to generate an offline control signal 590 to mobile electronic device 100 indicating that it is exceeding the speed threshold 595. This may be in addition to the operation of call inhibitor 541, or may be in place of utilizing call inhibitor 541.

It is noted that the speed of mobile electronic device 100 can be monitored as long as it is powered on and full functionality can be restored when it is determined that the speed of mobile electronic device 100 is below the speed threshold 590. In one embodiment, the speed of mobile electronic device 100 must stay below the speed threshold 590 for a pre-determined period of time before incoming and/or outgoing calls are again permitted. This prevents a user from temporarily slowing down in order to enable the use of mobile electronic device 100. In one embodiment, this may comprise determining at least once that the speed of mobile electronic device 100 is below the speed threshold 590. Typically, a plurality of determinations of the speed of mobile electronic device 100 is made within a pre-determined time period. If the speed of mobile electronic device 100 is below the speed threshold 590 in each of these determinations, it is assumed that mobile electronic device 100 can be operated in a safe manner.

In embodiments of the present invention, when the speed of mobile electronic device 100 is below the speed threshold 590 for a pre-determined period, the incoming calls and/or text messages destined for mobile electronic device 100 which were automatically routed to the voice mail account are automatically forwarded to mobile electronic device 100. In one embodiment, a missed communication notice signal is sent from cellular base station 510 to mobile electronic device 100. This notifies the operator of mobile electronic device 100 that voice messages and/or text messages are being stored for them.

Figure 6B:
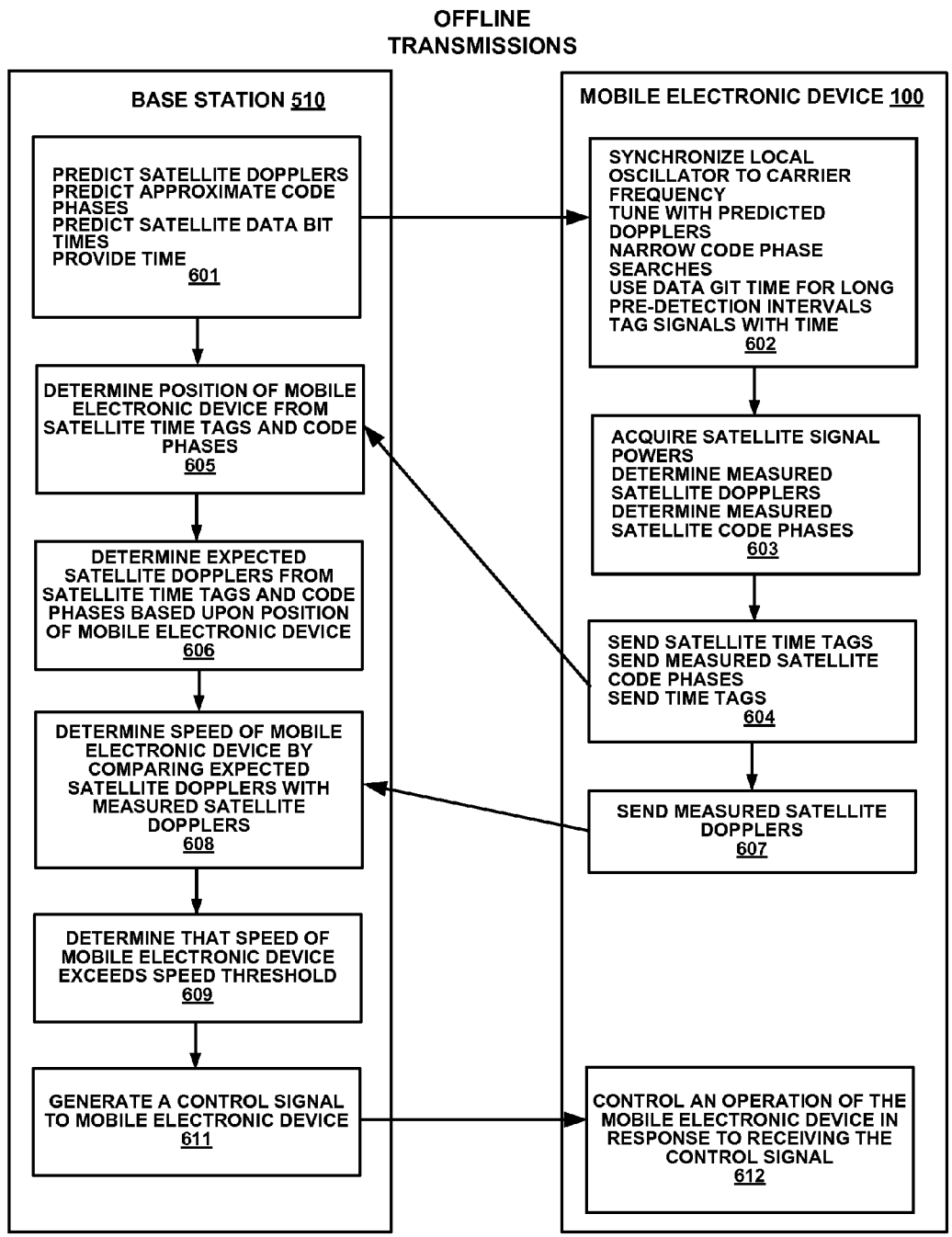

FIG. 6B shows an alternative sequence of events in accordance with embodiments of the present invention. In FIG. 6B, the events described above with reference to FIG. 6A which are generally followed in FIG. 6B will be omitted for brevity. In operation 611 of FIG. 6B, rather than inhibiting a transmission of a communication to or from mobile electronic device 100, base station 510 generates an offline control signal (e.g., 590 of FIG. 4) to mobile electronic device 100. In response to receiving control signal 590, control component 150 controls an operation of mobile electronic device 100. Additionally, the speed of mobile electronic device 100 can be monitored as long as it is powered on and full functionality can be restored when it is determined that the speed of mobile electronic device 100 is below the speed threshold 595. In one embodiment, the speed of mobile electronic device 100 must stay below the speed threshold 595 for a pre-determined period of time before incoming and/or outgoing calls are again permitted. In one embodiment, when the speed of mobile electronic device 100 is below speed threshold 595 for a pre-determined time interval, signal generator 542 can generate a second control signal which indicates to control component 150 that full functionality of mobile electronic device 100 can be restored.

Figure 6C:
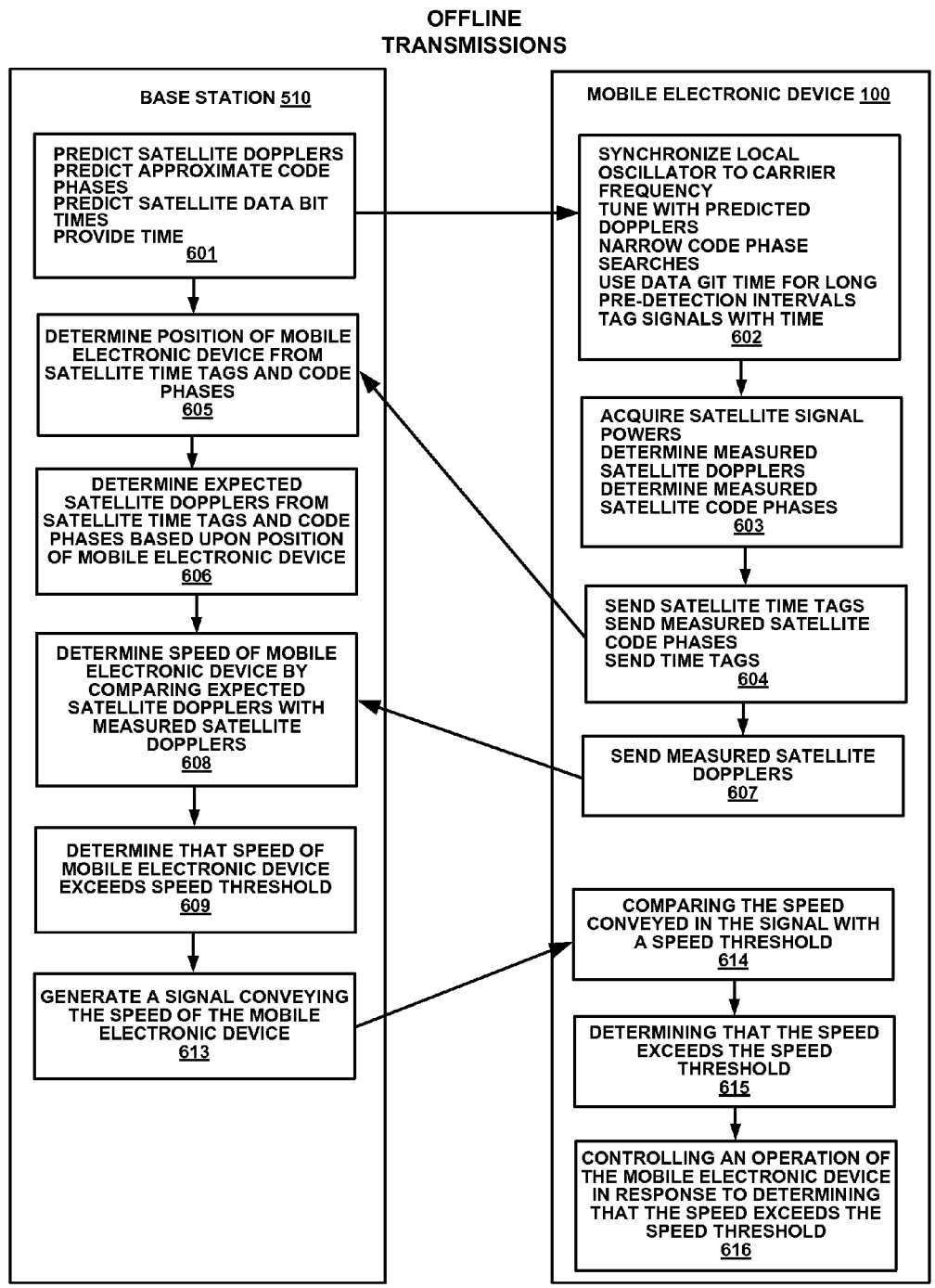

FIG. 6C shows an alternative sequence of events in accordance with embodiments of the present invention. In FIG. 6C, the events described above with reference to FIG. 6A which are generally followed in FIG. 6C will be omitted for brevity. In operation 613 of FIG. 6C, upon determining that the speed of mobile electronic device exceeds speed threshold 595, base station 510 generates control signal 590 which conveys the speed of mobile electronic device 100. In operation 614 of FIG. 6C, mobile electronic device 100 receives this control signal and control component 150 compares the speed conveyed in control signal 590 with speed threshold 390 using speed comparator 302. In operation 615 of FIG. 6C, speed comparator 302 determines that the speed of mobile electronic device 100 exceeds speed threshold 390. In one embodiment, when speed comparator 302 determines that the speed of mobile electronic device 100 exceeds speed threshold 390, it generates a control signal to function controller 303. In response to receiving the control signal, function controller 303 controls an operation of mobile electronic device 100 in operation 616 as described above.

Figure 6D:
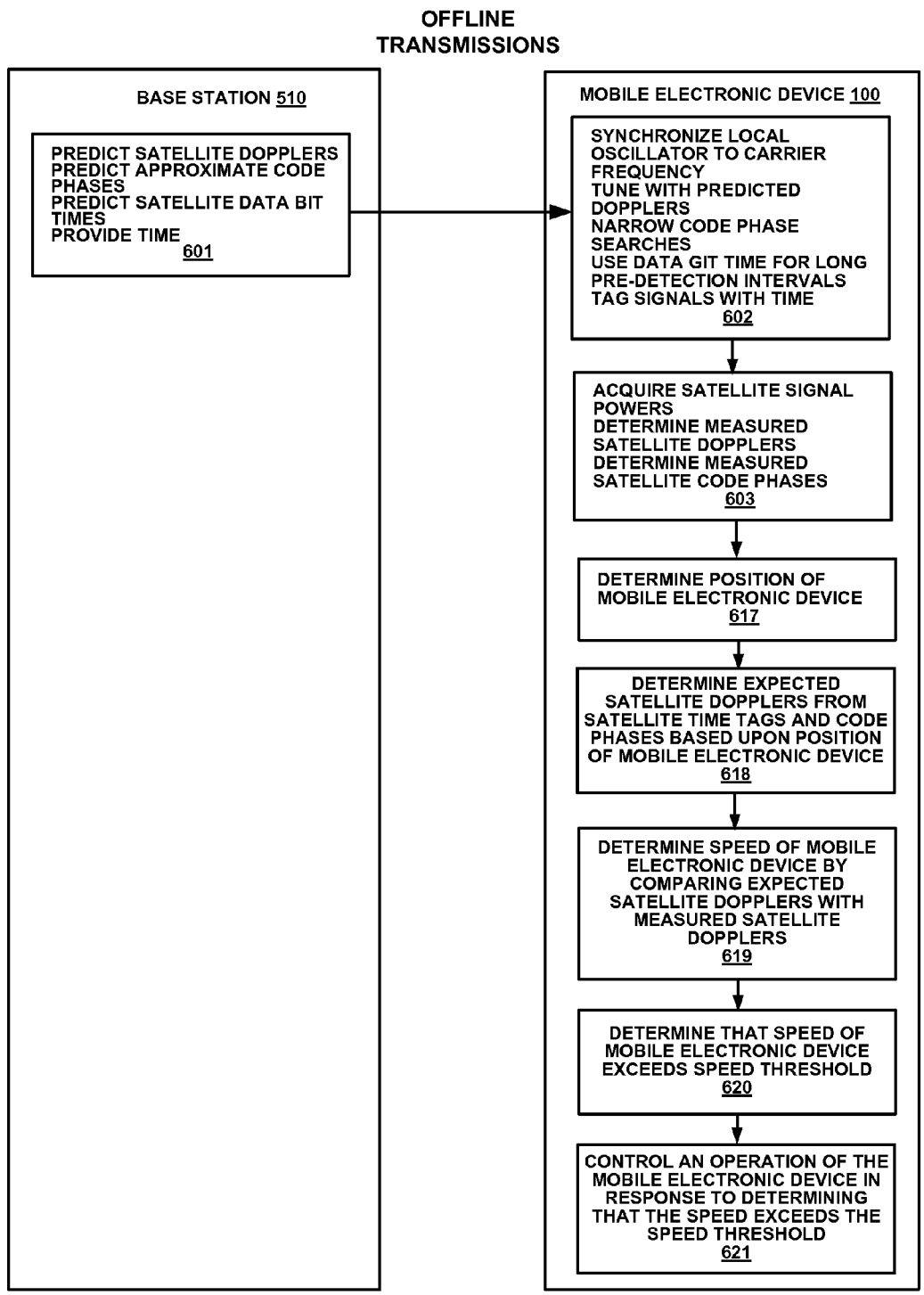

FIG. 6D shows an alternative sequence of events in accordance with embodiments of the present invention. In FIG. 6D, the events described above with reference to FIG. 6A which are generally followed in FIG. 6D will be omitted for brevity. In FIG. 6D, after acquiring satellite signal powers, determining measured satellite Dopplers, and determining measured satellite code phases, mobile electronic device 100 determines its position in operation 617. In the embodiment of FIG. 6D, position determiner 162 determines the position of mobile electronic device 100 based upon the measured GNSS time tags and measured GNSS code phase offsets received by GNSS system 112.

Embodiments of the present invention utilize methods well known in the art to determine the location of an object based upon GPS code phase and GNSS time tags received at the location of the object.

In operation 618 of FIG. 6D, the expected GNSS Doppler frequency shift measurements are determined based upon the position of mobile electronic device 100. In embodiments of the present invention, mobile electronic device 100 determines what the expected Doppler frequency shift should be for received GNSS signals if mobile electronic device 100 were stationary.

In operation 619 of FIG. 6D, mobile electronic device 100 determines its speed by comparing expected satellite Dopplers with measured satellite Dopplers. In one embodiment, speed determiner 160 determines the speed of mobile electronic device 100 as described above with reference to operation 608 of FIG. 6A.

In operation 620 of FIG. 6D, it is determined that the speed of mobile electronic device 100 exceeds a speed threshold. In one embodiment, speed determiner 160 generates a signal which conveys the speed of mobile electronic device 100 to control component 150. Speed comparator 302 then compares that speed with speed threshold 390. When speed comparator 302 determines that the speed of mobile electronic device 100 exceeds speed threshold 390, speed comparator generates a control signal to function controller 303.

In operation 621 of FIG. 6D, an operation of mobile electronic device 100 is controlled in response to determining that its speed exceeds speed threshold 390. As described above, control component 150 is configured to control an operation of mobile electronic device 100 as described above with reference to FIG. 3.

Figure 7:
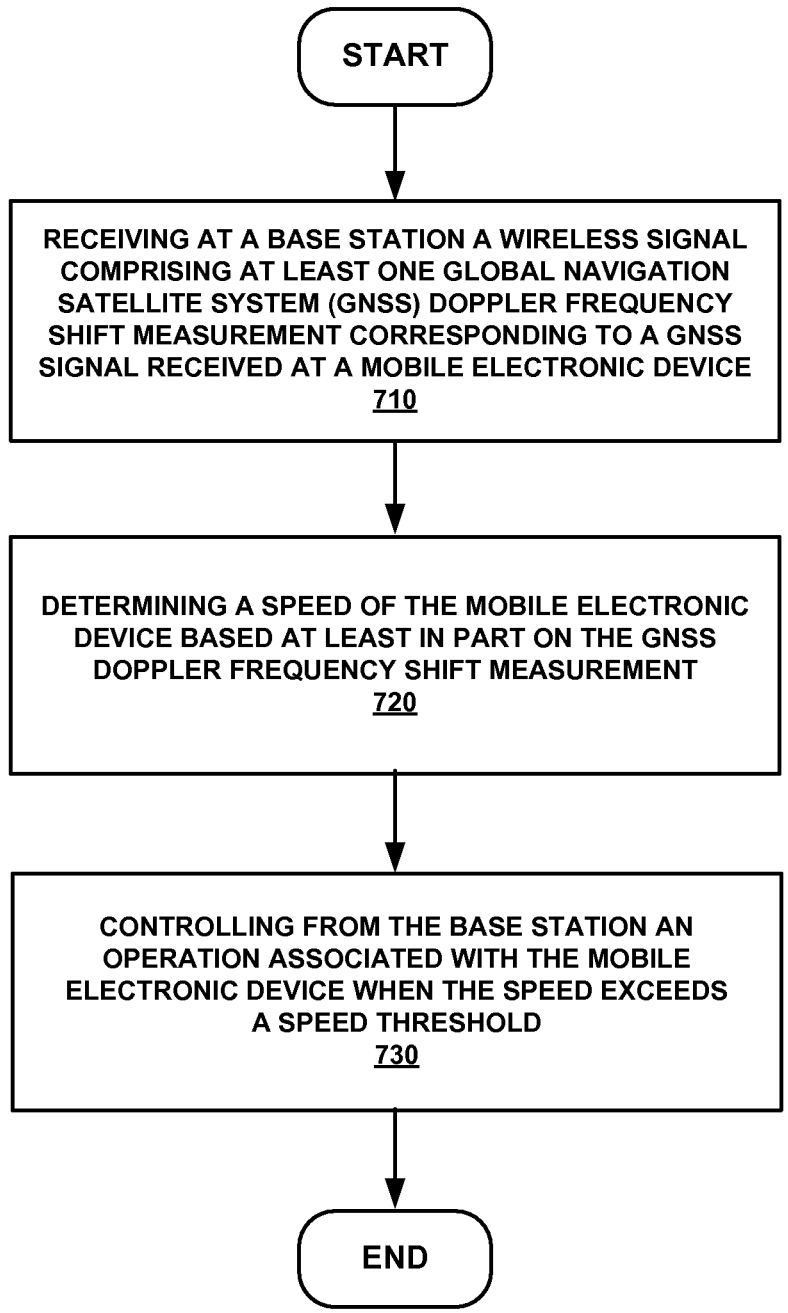
FIG. 7 is a flowchart of a method for limiting the functionality of an electronic device in accordance with embodiments of the present invention.

FIG. 7 is a flowchart 700 of a method for limiting the functionality of an electronic device in accordance with embodiments of the present invention. In operation 710 of FIG. 7, a wireless signal, comprising at least one GNSS Doppler frequency shift measurement corresponding to a GNSS signal received at a mobile electronic device, is received at a base station. As described above with reference to FIGS. 6A and 6B, a cellular base station (e.g., 510) receives measured GNSS Doppler frequency shift measurements which are measured at the location of mobile electronic device 100. In one embodiment, the of GNSS Doppler frequency shift measurement is performed by mobile electronic device 100 itself. In one embodiment, the cellular base station (e.g., 510) uses the measured code phase offsets to determine the position of mobile electronic device 100. In another embodiment, cellular base station 510 may receive the position of mobile electronic device 100 rather than derive the position based upon the measured GNSS satellite code phase offsets.

In operation 720 of FIG. 7, the speed of the mobile electronic device is determined based at least in part on the GNSS Doppler frequency shift measurement. As described above, in one embodiment cellular base station (e.g., 510) determines the speed of mobile electronic device 100 based upon a comparison of the GNSS Doppler frequency shift measurements received from mobile electronic device 100 and the expected GNSS Doppler frequency shifts (e.g., received from GNSS receiver 570). As described above with reference to operation 609 of FIG. 6A, the speed of mobile electronic device may be determined based upon a vector analysis of at least one Doppler frequency shift, or of range rates which are relative by a constant factor to an expected Doppler frequency shift at the geographic position of mobile electronic device 100. In one embodiment, cellular base station 510 additionally uses an indication of the geographic position of mobile electronic device 100 in making a determination of the speed of mobile electronic device 100. In one embodiment, this is based upon cellular base station 510 receiving at least one measured GNSS code phase offset from mobile electronic device 100.

As described above, the expected GNSS Doppler frequency shift is based upon the relative motion of a GNSS satellite and a fixed location. However, when mobile electronic device 100 is moving, the Doppler frequency shift will be different from the expected Doppler frequency shift. The difference between the GNSS Doppler frequency shift measurements and the expected GNSS Doppler frequency shifts is due to the motion of mobile electronic device 100. Thus, in one embodiment base station 510 determines the difference between the expected GNSS Doppler frequency shifts and the GNSS Doppler frequency shift measurements received from mobile electronic device to determine the speed of mobile electronic device 100.

In operation 730 of FIG. 7, an operation associated with the mobile electronic device is controlled from the base station when the speed of the remote device exceeds a speed threshold. As described above, cellular base station 510 can block incoming and/or outgoing calls for mobile electronic device 100 upon determining that the speed of mobile electronic device 100 exceeds a speed threshold 595. Alternatively, cellular base station may generate a control signal 590 to mobile electronic device 100 which indicates that the speed of mobile electronic device 100 exceeds a speed threshold 595. Upon receiving the control signal 590 from cellular base station

510, control component 150 can control the functionality of mobile electronic device 100 as described above with reference to FIG. 3.

Figure 8:
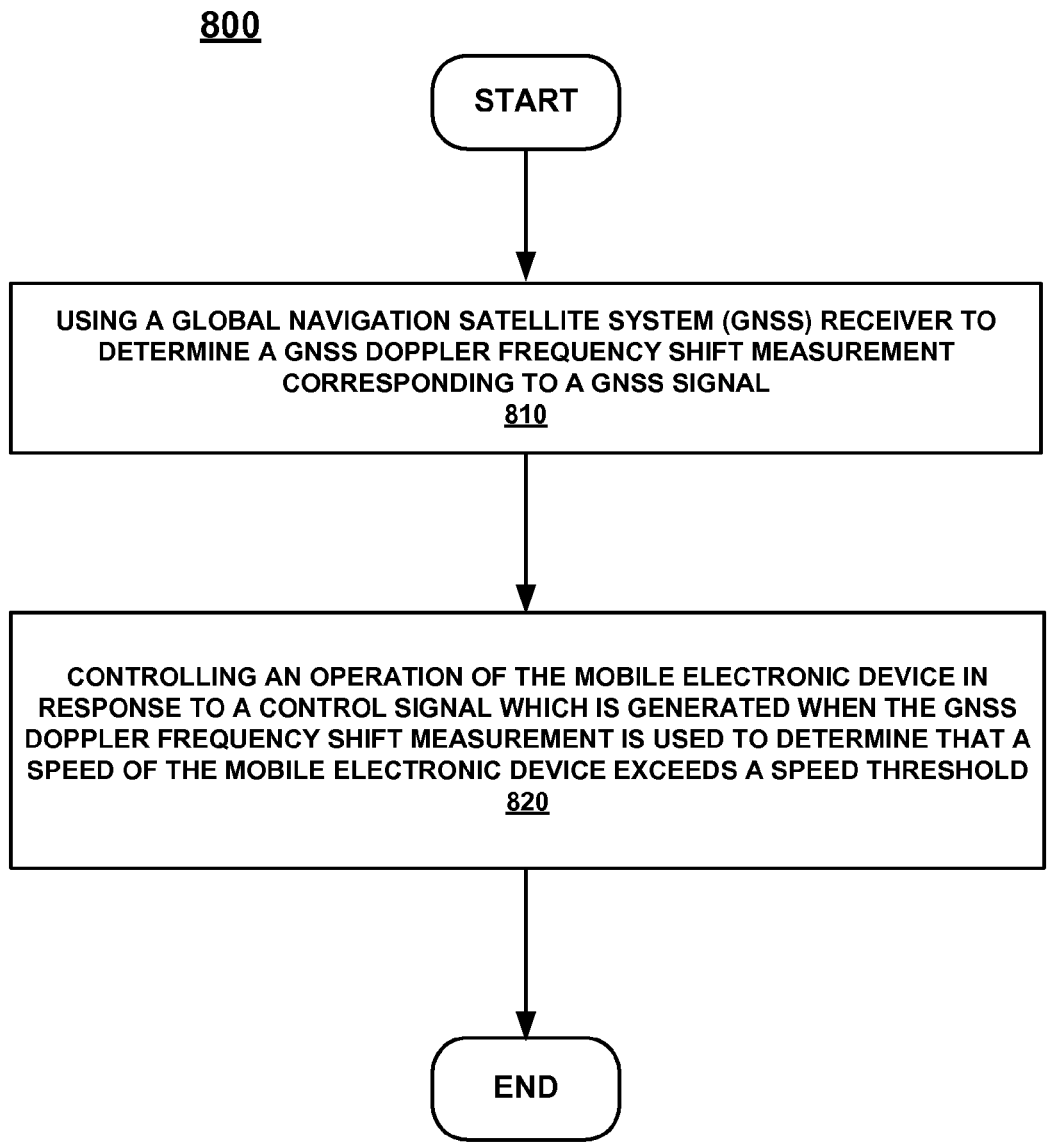
FIG. 8 is a flowchart of a method for limiting the functionality of a communication device in accordance with embodiments of the present invention.

FIG. 8 is a flowchart of a method 800 for limiting the functionality of a mobile electronic device in accordance with embodiments of the present invention. In operation 810 of FIG. 8, a GNSS receiver is used to determine a GNSS Doppler frequency shift measurement corresponding to a GNSS signal. In one embodiment, mobile electronic device 100 determines a GNSS Doppler frequency shift measurement which is due to the relative motion of mobile electronic device 100 and a GNSS satellite which is generating a GNSS navigation signal.

In operation 820 of FIG. 8, an operation of the mobile electronic device is controlled in response to a control signal which is generated when the GNSS Doppler frequency shift measurement is used to determine that a speed of the mobile electronic device exceeds a speed threshold. In one embodiment, the transmission of measured GNSS code phase offsets and/or GNSS Doppler frequency shift measurements are typically sent from mobile electronic device 100 in one or more offline transmissions. The GNSS Doppler frequency shift measurements can be used by cellular base station 510 to determine the speed of mobile electronic device 100 by comparing them with the expected GNSS Doppler frequency shifts which are measured by, for example, GNSS receiver 570. The measured GNSS code phase offsets can be used by cellular base station 510 to determine the position of mobile electronic device 100. It is again noted that the position of mobile electronic device 100 may be determined by GNSS system 112 and sent to cellular base station 510.

In one embodiment, an offline control signal 590 is received at mobile electronic device 100 when the base station 510 determines that the speed of the mobile electronic device 100 exceeds a speed threshold. As described above, cellular base station 510 uses the GNSS Doppler frequency shift measurement received from mobile electronic device 100 to determine the speed of mobile electronic device 100. In one embodiment, in response to determining that the speed of mobile electronic device 100 exceeds a speed threshold 595, cellular base station 510 generates a control signal 590 to mobile electronic device 100. In one embodiment, the control signal 590 indicates to mobile electronic device 100 that it is exceeding the speed threshold 595. In another embodiment, control signal 590 conveys the speed of mobile electronic device. Speed comparator 302 of mobile electronic device compares that speed with speed threshold 390. When speed comparator 302 determines that the speed of mobile electronic device exceeds speed threshold 390, it generates a control signal. In response to the control signal, function controller 303 controls an operation of mobile electronic device 100.

In one embodiment, a control component 150 disposed within the wireless communication device is utilized to automatically control an operation of the wireless communication device in response to the offline control signal 590. As described above, control component 150 is disposed within volatile memory 103 in one embodiment. In one embodiment, control component 150 is configured to automatically control an operation of mobile electronic device 100 in response to an offline control signal 590 generated by cellular base station 510. As described above with reference to FIG. 3, control component 150 can prevent the exchange of messages between mobile electronic device 100 and other locations such as cellular base station 510. In one embodiment, control component 150 is configured to require the implementation of safety measures when operating mobile electronic device 100 such as the use of a hands free headset, the use of a voice activation system, etc. In another embodiment, speed determiner 160 of mobile electronic device 100 determines the speed of mobile electronic device. Speed comparator 302 generates a control signal when the speed of mobile electronic device 100 exceeds speed threshold 390. In response, function controller 303 controls an operation of mobile electronic device 100.

Figure 9:
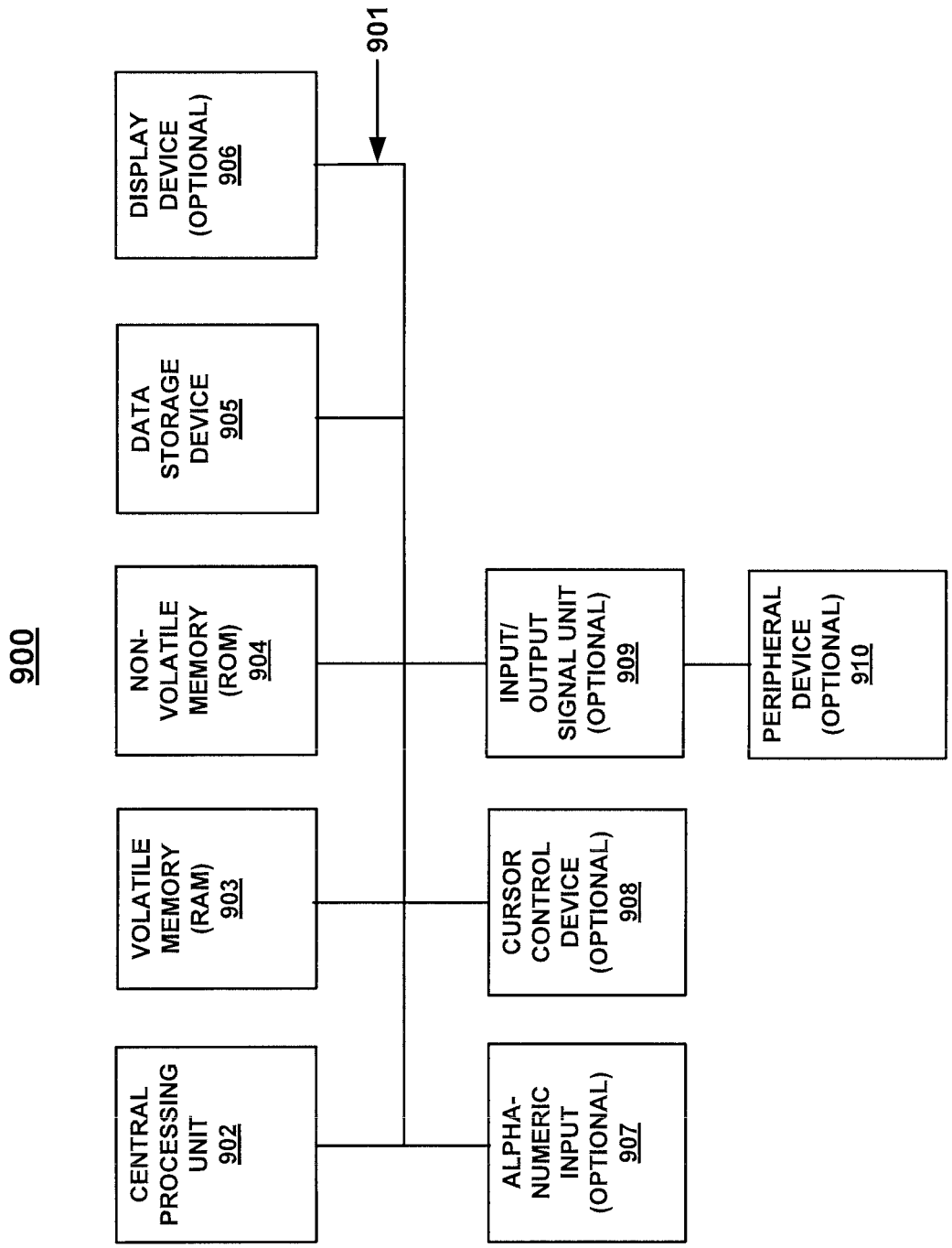
FIG. 9 is a block diagram of an exemplary computer system upon which embodiments of the present invention may be implemented.

FIG. 9 is a block diagram of an exemplary computer system 900 upon which embodiments of the present invention may be implemented. With reference to FIG. 9, portions of the present invention are comprised of computer-readable and computer-executable instructions that reside, for example, in computer system 900 which is used as a part of a general purpose computer network (not shown). It is appreciated that computer system 900 of FIG. 9 is exemplary only and that the present invention can operate within a number of different computer systems including general-purpose computer systems, embedded computer systems, laptop computer systems, hand-held computer systems, and stand-alone computer systems. In embodiments of the present invention, cellular base station 510 may implement various components such as speed determiner 530, comparator 531, communication controller 540, call inhibitor 541, signal generator 542, and GNSS signal acquisition assistance generator 560 using computer system 900.

In the present embodiment, computer system 900 includes an address/data bus 901 for conveying digital information between the various components, a central processor unit (CPU) 902 for processing the digital information and instructions, a volatile main memory 903 comprised of volatile random access memory (RAM) for storing the digital information and instructions, and a non-volatile read only memory (ROM) 904 for storing information and instructions of a more permanent nature. In addition, computer system 900 may also include a data storage device 905 (e.g., a magnetic, optical, floppy, or tape drive or the like) for storing vast amounts of data. It should be noted that the software program for limiting the functionality of an electronic device of the present invention can be stored either in volatile memory 903, data storage device 905, or in an external storage device (not shown).

Devices which are optionally coupled to computer system 900 include a display device 906 for displaying information to a computer user, an alpha-numeric input device 907 (e.g., a keyboard), and a cursor control device 908 (e.g., mouse, trackball, light pen, etc.) for inputting data, selections, updates, etc. Computer system 900 can also include a mechanism for emitting an audible signal (not shown).

Returning still to FIG. 9, optional display device 906 of FIG. 9 may be a liquid crystal device, cathode ray tube, or other display device suitable for creating graphic images and alpha-numeric characters recognizable to a user. Optional cursor control device 908 allows the computer user to dynamically signal the two dimensional movement of a visible symbol (cursor) on a display screen of display device 906. Many implementations of cursor control device 908 are known in the art including a trackball, mouse, touch pad, joystick, or special keys on alpha-numeric input 907 capable of signaling movement of a given direction or manner displacement. Alternatively, it will be appreciated that a cursor can be directed and/or activated via input from alpha-numeric input 907 using special keys and key sequence commands. Alternatively, the cursor may be directed and/or activated via input from a number of specially adapted cursor directing devices.

Furthermore, computer system 900 can include an input/output (I/O) signal unit (e.g., interface) 909 for interfacing with a peripheral device 910 (e.g., a computer network, modem, mass storage device, etc.). Accordingly, computer system 900 may be coupled in a network, such as a client/server environment, whereby a number of clients (e.g., personal computers, workstations, portable computers, minicomputers, terminals, etc.) are used to run processes for performing desired tasks. In particular, computer system 900 can be coupled in a system for limiting the functionality of an electronic device.

EXAMPLE GNSS RECEIVER

Figure 10:
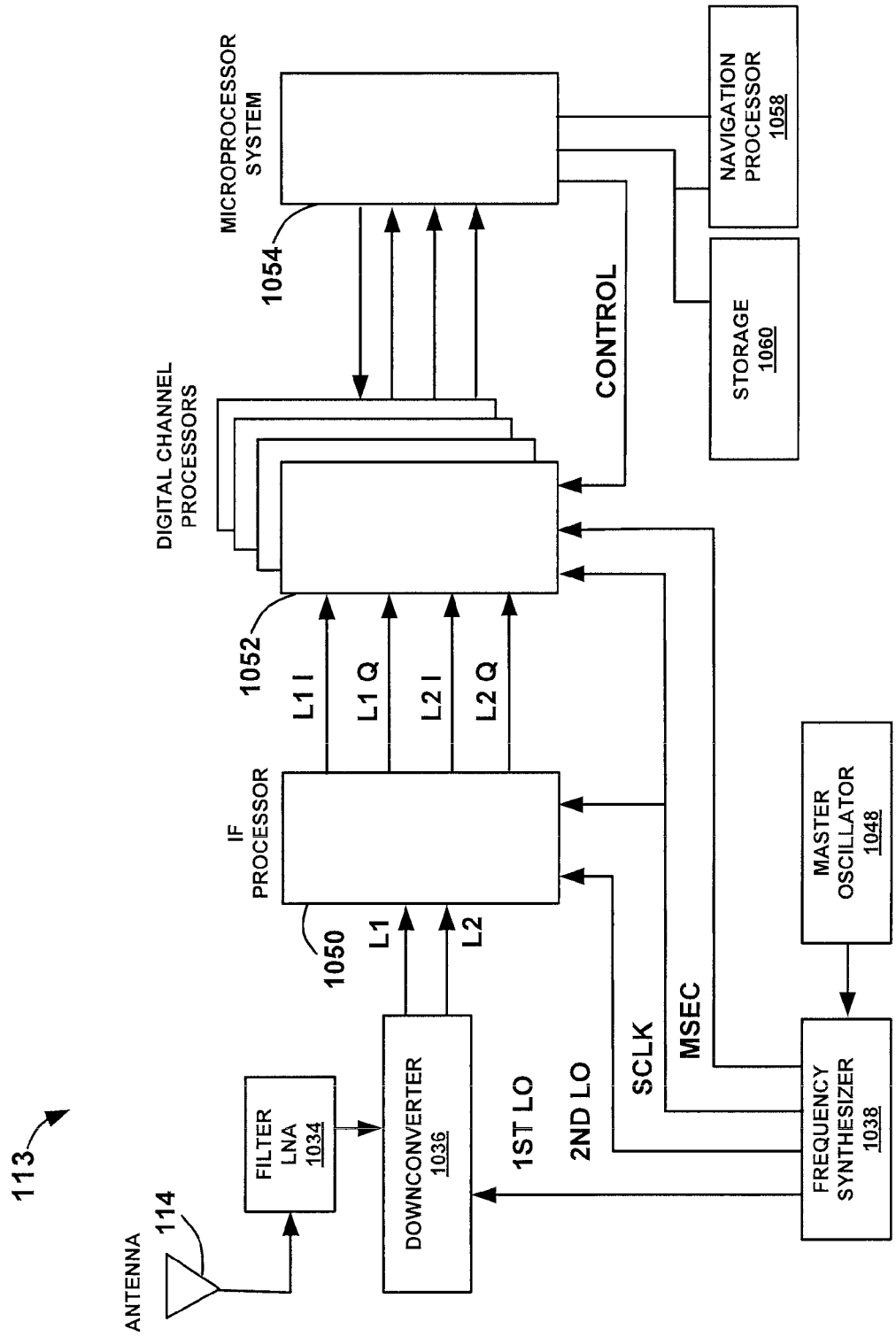
FIG. 10 is a block diagram of an example satellite navigation receiver used in accordance with an embodiment of the present invention.

With reference now to FIG. 10, a block diagram is shown of an embodiment of an example satellite navigation receiver which may be used in accordance an embodiment described herein. In particular, FIG. 10 illustrates a block diagram of a GNSS receiver (e.g., 113 of FIG. 1 and/or 570 of FIG. 5) in the form of a general purpose GPS receiver capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments of the present technology may be utilized by GNSS receivers which access the L1 signals alone, or in combination with the L2 signal(s). A more detailed discussion of the function of a receiver such as GPS receiver 113 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GNSS receiver 113 of FIG. 10.

In FIG. 10, received L1 and L2 signal is generated by at least one GPS satellite. Each GPS satellite generates different signal L1 and L2 signals and they are processed by different digital channel processors 1052 which operate in the same way as one another. FIG. 10 shows GPS signals (L1=1575.42 MHz, L2=1227.60 MHz) entering GPS receiver 113 through a dual frequency antenna 114. Master oscillator 1048 provides the reference oscillator which drives all other clocks in the system. Frequency synthesizer 1038 takes the output of master oscillator 1048 and generates important clock and local oscillator frequencies used throughout the system. For example, in one embodiment frequency synthesizer 1038 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 1034 performs filtering and low noise amplification of both L1 and L2 signals. The noise figure of GPS receiver 113 is dictated by the performance of the filter/LNA combination. The downconverter 1036 mixes both L1 and L2 signals in frequency down to approximately 175 MHz and outputs the analogue L1 and L2 signals into an IF (intermediate frequency) processor 30. IF processor 1050 takes the analog L1 and L2 signals at approximately 175 MHz and converts them into digitally sampled L1 and L2 in-phase (L1 I and L2 I) and quadrature signals (L1 Q and L2 Q) at carrier frequencies 420 KHz for L1 and at 2.6 MHz for L2 signals respectively.

At least one digital channel processor 1052 inputs the digitally sampled L1 and L2 in-phase and quadrature signals. All digital channel processors 1052 are typically are identical by design and typically operate on identical input samples. Each digital channel processor 1052 is designed to digitally track the L1 and L2 signals produced by one satellite by tracking code and carrier signals and to form code and carrier phase measurements in conjunction with the microprocessor system 1054. One digital channel processor 1052 is capable of tracking one satellite in both L1 and L2 channels. Microprocessor system 1054 is a general purpose computing device which facilitates tracking and measurements processes, providing pseudorange and carrier phase measurements for a navigation processor 1058. In one embodiment, microprocessor system 1054 provides signals to control the operation of one or more digital channel processors 1052. Navigation processor 1058 performs the higher level function of combining measurements in such a way as to produce position, velocity and time information for determining a position. Storage 1060 is coupled with navigation processor 1058 and microprocessor system 1054. It is appreciated that storage 1060 may comprise a volatile or non-volatile storage such as a RAM or ROM, or some other computer readable memory device or media. It is noted that microprocessor system 1054, navigation processor 1058 and/or storage 1060 may reside outside of receiver 113 in an embodiment of the present invention. In other words, the functions performed by microprocessor system 1054 and/or navigation processor 1058 may be performed by processor 101 of FIG. 1.

The preferred embodiment of the present invention, method and communication system for limiting the functionality of an electronic device, is thus described. While the present invention has been described in particular embodiments, it should be appreciated that the present invention should not be construed as limited by such embodiments, but rather construed according to the following claims.

What is claimed is:

1. A mobile electronic device comprising:
   a Global Navigation Satellite System (GNSS) receiver configured to determine a GNSS Doppler frequency shift measurement corresponding to a GNSS signal; and
   a control component configured to control an operation of said mobile electronic device in response to a control signal received from a system comprising a speed determiner configured to use said GNSS Doppler frequency shift measurement to determine a speed of said mobile electronic device wherein said speed determiner is further configured to use a geographical position corresponding to said mobile electronic device and an orbital parameter for a GNSS satellite to determine an expected value proportional to an expected range rate between said mobile electronic device and a GNSS satellite and configured to use said expected value with said GNSS Doppler frequency shift measurement to determine said speed and wherein said control signal is generated when said GNSS Doppler frequency shift measurement is used to determine that said speed of said mobile electronic device exceeds a speed threshold.

2. The mobile electronic device of claim 1 further comprising:
   a communication transceiver configured to automatically transmit to a station an offline GNSS data signal comprising said GNSS Doppler frequency shift measurement and a time tag, and to automatically receive from said station an offline signal which conveys said control signal when said station uses said GNSS Doppler frequency shift measurement to determine that said speed of said mobile electronic device exceeds said speed threshold.

3. The mobile electronic device of claim 2 wherein said communication transceiver is configured to receive one or more offline wireless signals comprising a predicted Doppler frequency shift, a predicted GNSS code phase offset, a GNSS data bit time prediction, and a GNSS clock time estimate for use by the GNSS receiver for acquiring said GNSS signal.

4. The mobile electronic device of claim 3 wherein said GNSS receiver is configured to use said predicted Doppler frequency shift, said predicted GNSS code phase offset, said GNSS data bit time prediction, and said GNSS clock time estimate for tuning to a carrier frequency, decreasing a time for making said measurement of said Doppler frequency shift, narrowing a range of GNSS code phase offsets for making a GNSS code phase offset determination and generating a GNSS clock time tag for said GNSS signal.

5. The mobile electronic device of claim 1 wherein said system is configured to receive at least one GNSS code phase offset determination for said GNSS signal received at said mobile electronic device and wherein said speed determiner is configured to determine said geographic position of said mobile electronic device based at least in part on said GNSS code phase offset determination.

6. The mobile electronic device of claim 1 further comprising:
a communication transceiver configured to receive an offline wireless signal having said speed; and:
a speed comparator configured to determine when said speed exceeds said speed threshold.

7. The mobile electronic device of claim 1 wherein said speed determiner further comprises:
a relative measurement calculator configured to calculate a plurality of measured range rates corresponding to a plurality of said GNSS Doppler frequency shift measurements and calculating a plurality of expected range rates between said mobile electronic device and a plurality of GNSS satellites; and
a comparator configured to compare said measured range rates with said expected range rates to determine said speed.

8. The mobile electronic device of claim 1 wherein said control component is configured to initiate an action in response to said control signal and wherein said action is selected from the group consisting of: generating an audible notification by said mobile electronic device when a user input device in said mobile electronic device is operated, restricting an operation of a user input device of said mobile electronic device, requiring the use of a hands-free operation device to operate said mobile electronic device, and requiring the use of a voice activation system to operate said mobile electronic device.

9. The mobile electronic device of claim 1 further comprising:
a communication transceiver configured to receive one or more offline wireless signals comprising a predicted Doppler frequency shift, a predicted GNSS code phase offset, a GNSS data bit time prediction, and a GNSS clock time estimate and wherein said GNSS receiver is configured to use said predicted Doppler frequency shift, said predicted GNSS code phase offset, said GNSS data bit time prediction, and said GNSS clock time estimate for tuning to a carrier frequency, decreasing a time for making said measurement of said Doppler frequency shift, narrowing a range of GNSS code phase offsets for making a GNSS code phase offset determination and generating a GNSS clock time tag for said GNSS signal, said communication transceiver further configured to transmit to a station an offline GNSS data signal comprising said GNSS Doppler frequency shift measurement, said GNSS code phase offset determination, and a time tag and to receive from said station an offline signal which conveys said control signal when said station uses said GNSS Doppler frequency shift measurement to determine that said speed of said mobile electronic device exceeds said speed threshold; and and wherein said station determines said geographic position of said mobile electronic device based at least in part on said GNSS code phase offset determination and utilizes a speed determiner configured to use an orbital parameter for a GNSS satellite to determine a relative expected value proportional to a relative expected range rate between said mobile electronic device and said GNSS satellite and is further configured to use said relative expected value with said GNSS Doppler frequency shift measurement to determine said speed and to generate said control signal in response to determining that said speed of said mobile electronic device exceeds said speed threshold.

10. The mobile electronic device of claim 9 wherein said speed determiner further comprises:
a relative measurement calculator configured to calculate a plurality of measured range rates corresponding to a plurality of said GNSS Doppler frequency shift measurements and calculating a plurality of expected range rates between said mobile electronic device and a plurality of GNSS satellites; and
a comparator configured to compare said measured range rates with said expected range rates to determine said speed.

11. The mobile electronic device of claim 1 wherein said control signal conveys said speed from a base station to said mobile electronic device and wherein said control component is configured to control an operation of said mobile electronic device in response to said control signal.

12. The mobile electronic device of claim 1 further comprising:
a speed determiner configured to use said GNSS Doppler frequency shift measurement to determine that a speed of said mobile electronic device exceeds said speed threshold and to generate said control signal in response to said determining.

13. The mobile electronic device of claim 12 further comprising:
a communication transceiver configured to receive one or more offline wireless signals comprising a predicted Doppler frequency shift, a predicted GNSS code phase offset, a GNSS data bit time prediction, and a GNSS clock time estimate.

14. The mobile electronic device of claim 12 wherein said GNSS receiver is configured to use said predicted Doppler frequency shift, said predicted GNSS code phase offset, said GNSS data bit time prediction, and said GNSS clock time estimate for tuning to a carrier frequency, decreasing a time for making said measurement of said Doppler frequency shift, narrowing a range of GNSS code phase offsets for making a GNSS code phase offset determination and generating a GNSS clock time tag for said GNSS signal.

15. The mobile electronic device of claim 12 wherein said speed determiner is further configured to use a geographical position corresponding to said mobile electronic device and an orbital parameter for a GNSS satellite to determine an expected value proportional to a expected range rate for said GNSS satellite and configured to use said expected value with said GNSS Doppler frequency shift measurement to determine said speed.

16. The mobile electronic device of claim 15 wherein said speed determiner further comprises:

a relative measurement calculator configured to calculate a plurality of measured range rates corresponding to a plurality of said GNSS Doppler frequency shift measurements and calculating a plurality of expected range rates between said mobile electronic device and a plurality of GNSS satellites; and a comparator configured to compare said measured range rates with said expected range rates to determine said speed.

17. A method for limiting the functionality of a mobile electronic device, said method comprising:

using a Global Navigation Satellite System (GNSS) receiver to determine a GNSS Doppler frequency shift measurement corresponding to a GNSS signal; and controlling an operation of said mobile electronic device in response to receiving a control signal from a system comprising a speed determiner configured to use said GNSS Doppler frequency shift measurement to determine a speed of said mobile electronic device and to use a geographical position corresponding to said mobile electronic device and an orbital parameter for a GNSS satellite to determine an expected value proportional to an expected range rate between said mobile electronic device and a GNSS satellite and to use said expected value with said GNSS Doppler frequency shift measurement to determine said speed and wherein said control signal is generated when said GNSS Doppler frequency shift measurement is used to determine that said speed of said mobile electronic device exceeds a speed threshold.

18. The method as recited in claim 17 further comprising:

transmitting to a station an offline GNSS data signal comprising said GNSS Doppler frequency shift measurement and a time tag; and automatically receiving an offline signal from said station which conveys said control signal when said station uses said GNSS Doppler frequency shift measurement to determine that said speed of said mobile electronic device exceeds said speed threshold.

19. The method as recited in claim 18 further comprising:

receiving one or more offline wireless signals comprising a predicted Doppler frequency shift, a predicted GNSS code phase offset, a GNSS data bit time prediction, and a GNSS clock time estimate for use by the GNSS receiver for acquiring said GNSS signal.

20. The method as recited in claim 19 further comprising:

using said predicted Doppler frequency shift, said predicted GNSS code phase offset, said GNSS data bit time prediction, and said GNSS clock time estimate for:
tuning to a carrier frequency;
decreasing a time for making said measurement of said Doppler frequency shift;
narrowing a range of GNSS code phase offsets for making a GNSS code phase offset determination; and
generating a GNSS clock time tag for said GNSS signal.

21. The method as recited in claim 17 further comprising:

receiving at least one GNSS code phase offset determination for said GNSS signal received at said mobile electronic device; and determining by said speed determiner said geographic position of said mobile electronic device based at least in part on said GNSS code phase offset determination.

22. The method as recited in claim 17 further comprising receiving an offline wireless signal having said speed; and wherein:

using a speed comparator to determine when said speed exceeds said speed threshold.

23. The method as recited in claim 17 wherein using said speed determiner further comprises:

using a relative measurement calculator to calculate a plurality of measured range rates corresponding to a plurality of said GNSS Doppler frequency shift measurements and to calculate a plurality of expected range rates between said mobile electronic device and a plurality of GNSS satellites; and comparing said relative measured range rates with said expected range rates to determine said speed.

24. The method as recited in claim 17 further comprising:

initiating an action in response to said control signal and wherein said action is selected from the group consisting of: generating an audible notification by said mobile electronic device when a user input device in said mobile electronic device is operated, restricting an operation of a user input device of said mobile electronic device, requiring the use of a hands-free operation device to operate said mobile electronic device, and requiring the use of a voice activation system to operate said mobile electronic device.

25. The method as recited in claim 17 further comprising:

receiving one or more offline wireless signals comprising a predicted Doppler frequency shift, a predicted GNSS code phase offset, a GNSS data bit time prediction, and a GNSS clock time estimate;

using said predicted Doppler frequency shift, said predicted GNSS code phase offset, said GNSS data bit time prediction, and said GNSS clock time estimate for:
tuning to a carrier frequency;
decreasing a time for making said measurement of said Doppler frequency shift;
narrowing a range of GNSS code phase offsets for making a GNSS code phase offset determination; and
generating a GNSS clock time tag for said GNSS signal;

transmitting to a station an offline GNSS data signal comprising said GNSS Doppler frequency shift measurement, said GNSS code phase offset determination, and a time tag;

determining by said station said geographic position of said mobile electronic device based at least in part on said GNSS code phase offset determination;

using a speed determiner configured to use an orbital parameter for a GNSS satellite to determine an expected value proportional to an expected range rate between said mobile electronic device and said GNSS satellite;

using said expected value with said GNSS Doppler frequency shift measurement to determine said speed and to generate said control signal in response to determining that said speed of said mobile electronic device exceeds said speed threshold; and receiving from said station an offline signal which conveys said control signal when said station uses said GNSS Doppler frequency shift measurement to determine that said speed of said mobile electronic device exceeds said speed threshold.

26. The method as recited in claim 25 wherein using said speed determiner further comprises:

using a relative measurement calculator to calculate a plurality of measured range rates corresponding to a plurality of said GNSS Doppler frequency shift measurements and calculating a plurality of expected range rates between said mobile electronic device and a plurality of GNSS satellites; and comparing said relative measured range rates with said expected range rates to determine said speed.

27. The method as recited in claim 17 further comprising:

using said control signal to convey said speed from a base station to said mobile electronic device; and using said control component to control an operation of said mobile electronic device in response to said control signal.

28. The method as recited in claim 17 further comprising:

utilizing a speed determiner to use said GNSS Doppler frequency shift measurement to determine that a speed of said mobile electronic device exceeds said speed threshold; and generating said control signal in response to said determining.

29. The method as recited in claim 28 further comprising:

receiving one or more offline wireless signals comprising a predicted Doppler frequency shift, a predicted GNSS code phase offset, a GNSS data bit time prediction, and a GNSS clock time estimate.

30. The method as recited in claim 28 further comprising:

using said predicted Doppler frequency shift, said predicted GNSS code phase offset, said GNSS data bit time prediction, and said GNSS clock time estimate for:

tuning to a carrier frequency;

decreasing a time for making said measurement of said Doppler frequency shift;

narrowing a range of GNSS code phase offsets for making a GNSS code phase offset determination; and generating a GNSS clock time tag for said GNSS signal.

31. The method as recited in claim 28 further comprising:

using a geographical position corresponding to said mobile electronic device and an orbital parameter for a GNSS satellite to determine an expected value proportional to an expected range rate for said GNSS satellite; and using said expected value with said GNSS Doppler frequency shift measurement to determine said speed.

32. The method as recited in claim 31 further comprising:

using a relative measurement calculator to calculate a plurality of measured range rates corresponding to a plurality of said GNSS Doppler frequency shift measurements and to calculating a plurality of expected range rates between said mobile electronic device and a plurality of GNSS satellites; and comparing said measured range rates with said expected range rates to determine said speed.

* * * * *